US011750533B2

(12) United States Patent
Daly et al.

(10) Patent No.: US 11,750,533 B2
(45) Date of Patent: Sep. 5, 2023

(54) HARDWARE ASSISTED VIRTUAL SWITCH

(71) Applicant: Intel Corporation, Santa Clara, CA (US)

(72) Inventors: Daniel P. Daly, San Mateo, CA (US); Cunming Liang, Shanghai (CN); Jian Wang, Shanghai (CN); Martin Roberts, Wargrave (GB); Shih-Wei Chien, Taiwan (CN); Gerald Alan Rogers, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 247 days.

(21) Appl. No.: 16/643,626

(22) PCT Filed: Oct. 24, 2017

(86) PCT No.: PCT/CN2017/107442
§ 371 (c)(1),
(2) Date: Mar. 2, 2020

(87) PCT Pub. No.: WO2019/079960
PCT Pub. Date: May 2, 2019

(65) Prior Publication Data
US 2020/0403940 A1    Dec. 24, 2020

(51) Int. Cl.
*H04L 49/00*      (2022.01)
*G06F 12/0868*    (2016.01)
(Continued)

(52) U.S. Cl.
CPC .......... *H04L 49/70* (2013.01); *G06F 12/0868* (2013.01); *G06F 12/10* (2013.01);
(Continued)

(58) Field of Classification Search
CPC ..... H04L 49/70; H04L 49/90; G06F 12/0868; G06F 12/10; G06F 12/12; G06F 2212/152; G06F 2212/154
USPC .......................................................... 709/223
See application file for complete search history.

(56) References Cited

U.S. PATENT DOCUMENTS 5,909,686 A      6/1999  Muller et al.
6,357,003 B1 *   3/2002  Zarrin ................. G06F 9/45537
                                                       710/10
(Continued)

FOREIGN PATENT DOCUMENTS

AU   2014315117 A1 *  3/2016   ......... G06F 9/44505
CN   102549977 A       7/2012
(Continued)

OTHER PUBLICATIONS

International Search Report and Written Opinion in International Patent Application No. PCT/CN2017/107442 dated Jul. 25, 2018, 7 pages.
(Continued)

*Primary Examiner* — Zi Ye
*Assistant Examiner* — Berhanu Shitayewoldetadik
(74) *Attorney, Agent, or Firm* — Essential Patents Group, LLP; Christopher K. Gagne

(57) ABSTRACT

There is disclosed an example of a computing apparatus for providing a hardware-assisted virtual switch on a host, including: a hardware virtual switch (vSwitch) circuit; and a hardware virtual host (vHost) circuit, the vHost circuit having an interface driver specific to the hardware vSwitch and configured to provide a vHost data plane to: provide a plurality of hardware queues to communicatively couple the hardware vSwitch to a guest virtual function (VF); and
(Continued)

present to a virtual network driver of the guest VF an interface that is backward compatible with a software network interface.

20 Claims, 10 Drawing Sheets

(51) Int. Cl.
*H04L 15/16* (2006.01)
*G06F 12/06* (2006.01)
*G06F 12/12* (2016.01)
*H04L 12/931* (2013.01)
*H04L 12/861* (2013.01)
*G06F 12/10* (2016.01)
*H04L 49/90* (2022.01)

(52) U.S. Cl.
CPC .............. *G06F 12/12* (2013.01); *H04L 49/90* (2013.01); *G06F 2212/152* (2013.01); *G06F 2212/154* (2013.01)

(56) References Cited

U.S. PATENT DOCUMENTS

| | | | |
|---|---|---|---|
| 6,526,442 B1 | 2/2003 | Stupek, Jr. et al. | |
| 8,027,354 B1* | 9/2011 | Portolani | H04L 49/70 370/395.2 |
| 8,296,759 B1* | 10/2012 | Hutchins | G06F 9/45558 718/1 |
| 8,619,771 B2* | 12/2013 | Lambeth | H04L 69/22 370/392 |
| 8,918,631 B1* | 12/2014 | Kumar | H04L 63/00 370/254 |
| 9,031,081 B2* | 5/2015 | Elzur | H04L 49/602 370/395.53 |
| 9,577,879 B1* | 2/2017 | Kumar | H04L 45/04 |
| 9,594,598 B1* | 3/2017 | Brouwer | G06F 9/4856 |
| 9,983,832 B1* | 5/2018 | Mayatskikh | G06F 3/0643 |
| 10,169,068 B2* | 1/2019 | Brouwer | G06F 9/45558 |
| 10,447,728 B1* | 10/2019 | Steinberg | H04L 63/10 |
| 10,630,660 B1* | 4/2020 | Kumar | H04L 63/06 |
| 10,642,753 B1* | 5/2020 | Steinberg | G06F 21/56 |
| 10,721,273 B2* | 7/2020 | Rubakha | G06F 9/45558 |
| 10,909,066 B2* | 2/2021 | Zhu | H04L 67/141 |
| 10,999,219 B1* | 5/2021 | Athreyapurapu | H04L 41/0806 |
| 11,075,948 B2* | 7/2021 | Gourlay | H04L 41/0894 |
| 11,088,988 B2* | 8/2021 | Chuu | H04L 49/3063 |
| 2005/0108518 A1* | 5/2005 | Pandya | H04L 63/20 713/153 |
| 2005/0182853 A1* | 8/2005 | Lewites | H04L 12/4679 709/250 |
| 2006/0136570 A1* | 6/2006 | Pandya | G06F 16/951 709/217 |
| 2006/0165103 A1* | 7/2006 | Trudeau | H04L 12/2854 370/428 |
| 2006/0171323 A1* | 8/2006 | Qian | H04L 63/0272 370/395.5 |
| 2007/0011444 A1* | 1/2007 | Grobman | G06F 9/44547 713/2 |
| 2007/0050767 A1* | 3/2007 | Grobman | G06F 9/45558 718/1 |
| 2008/0201468 A1 | 8/2008 | Titus | |
| 2008/0244028 A1* | 10/2008 | Le | G06F 3/0607 713/1 |
| 2009/0119087 A1* | 5/2009 | Ang | G06F 9/45558 703/23 |
| 2009/0216992 A1* | 8/2009 | Greiner | G06F 12/10 711/206 |
| 2010/0014526 A1* | 1/2010 | Chavan | H04L 12/467 370/395.53 |
| 2010/0211946 A1* | 8/2010 | Elzur | G06F 9/45537 718/1 |
| 2010/0223397 A1* | 9/2010 | Elzur | H04L 49/70 718/1 |
| 2011/0023030 A1* | 1/2011 | Lim | G06F 9/5077 718/1 |
| 2011/0082962 A1* | 4/2011 | Horovitz | G06F 11/301 718/1 |
| 2011/0090915 A1* | 4/2011 | Droux | H04L 49/00 370/469 |
| 2011/0265116 A1 | 10/2011 | Stern et al. | |
| 2011/0320632 A1* | 12/2011 | Karino | H04L 45/38 709/238 |
| 2012/0144154 A1* | 6/2012 | Heller | G06F 9/4812 711/207 |
| 2012/0307838 A1* | 12/2012 | Manula | H04L 49/358 370/412 |
| 2012/0311208 A1* | 12/2012 | Manula | G06F 13/364 710/108 |
| 2012/0324442 A1* | 12/2012 | Barde | G06F 9/45558 718/1 |
| 2013/0031568 A1* | 1/2013 | Tamir | G06F 9/545 719/318 |
| 2013/0064133 A1* | 3/2013 | Ritz | G06F 9/4555 370/254 |
| 2013/0219030 A1* | 8/2013 | Szabo | H04L 49/70 709/221 |
| 2013/0254424 A1 | 9/2013 | Guay et al. | |
| 2014/0059160 A1* | 2/2014 | Chernoff | H04L 49/356 709/224 |
| 2014/0068137 A1* | 3/2014 | Kegel | G06F 12/1081 711/6 |
| 2014/0164670 A1 | 6/2014 | Voorhees et al. | |
| 2014/0244965 A1* | 8/2014 | Manula | G06F 12/1081 711/206 |
| 2014/0310704 A1* | 10/2014 | Cantu | G06F 9/45558 718/1 |
| 2014/0317261 A1* | 10/2014 | Shatzkamer | H04L 41/04 709/223 |
| 2014/0334492 A1* | 11/2014 | Mack-Crane | H04L 41/0895 370/392 |
| 2015/0128245 A1* | 5/2015 | Brown | H04L 63/0245 709/238 |
| 2015/0186173 A1* | 7/2015 | Wang | G06F 9/45558 718/1 |
| 2015/0215384 A1* | 7/2015 | Bannai | H04L 41/0897 709/201 |
| 2015/0301945 A1* | 10/2015 | Panesar | G06F 12/1009 711/203 |
| 2015/0370590 A1* | 12/2015 | Tuch | G06F 9/4843 718/1 |
| 2016/0085568 A1* | 3/2016 | Dupre | G06F 9/4812 718/1 |
| 2016/0147556 A1 | 5/2016 | Hu et al. | |
| 2016/0149771 A1 | 5/2016 | Prasad et al. | |
| 2016/0164832 A1* | 6/2016 | Bellagamba | H04L 45/64 726/11 |
| 2016/0210242 A1* | 7/2016 | Fontenot | G06F 3/0647 |
| 2016/0254956 A1* | 9/2016 | Xu | H04L 41/0886 370/255 |
| 2016/0329965 A1 | 11/2016 | Cook et al. | |
| 2016/0350151 A1* | 12/2016 | Zou | H04L 45/586 |
| 2016/0380909 A1* | 12/2016 | Antony | H04L 47/805 370/236 |
| 2017/0031719 A1* | 2/2017 | Clark | G06F 9/5016 |
| 2017/0046185 A1* | 2/2017 | Tsirkin | G06F 12/1009 |
| 2017/0063628 A1 | 3/2017 | Rasanen | |
| 2017/0063678 A1 | 3/2017 | Rasanen | H04L 41/5054 |
| 2017/0099182 A1 | 4/2017 | Debolle et al. | |
| 2017/0104609 A1 | 4/2017 | Mcnamee et al. | |
| 2017/0177396 A1* | 6/2017 | Palermo | G06F 9/45558 |
| 2017/0180273 A1* | 6/2017 | Daly | H04L 67/561 |
| 2017/0192921 A1* | 7/2017 | Wang | G06F 3/3004 |
| 2017/0272274 A1 | 9/2017 | Onno et al. | |
| 2017/0337071 A1* | 11/2017 | Scott | G06F 9/50 |
| 2017/0353433 A1* | 12/2017 | Antony | H04L 49/70 |
| 2017/0371698 A1* | 12/2017 | Paolino | H04L 49/70 |
| 2018/0034769 A1* | 2/2018 | Modi | H04L 47/125 |
| 2018/0059974 A1* | 3/2018 | Tsirkin | G06F 21/6218 |

(56) References Cited

U.S. PATENT DOCUMENTS

| | | | |
|---|---|---|---|
| 2018/0109471 A1* | 4/2018 | Chang | H04L 49/70 |
| 2018/0115585 A1* | 4/2018 | Rubakha | G06F 21/53 |
| 2018/0123963 A1 | 5/2018 | Thubert et al. | |
| 2018/0205673 A1* | 7/2018 | Jain | H04L 45/64 |
| 2018/0219770 A1* | 8/2018 | Wu | H04L 43/20 |
| 2018/0219777 A1* | 8/2018 | He | G06F 12/0284 |
| 2018/0287938 A1* | 10/2018 | Han | H04L 12/4633 |
| 2019/0018785 A1* | 1/2019 | Beard | G06F 12/1072 |
| 2019/0319896 A1* | 10/2019 | Guo | H04L 49/252 |
| 2019/0363985 A1* | 11/2019 | He | G06F 15/17331 |
| 2019/0370050 A1* | 12/2019 | Kumar | G06F 12/109 |
| 2020/0204486 A1* | 6/2020 | Wu | G06F 13/14 |
| 2021/0263857 A1* | 8/2021 | Roberts | G06F 12/1009 |
| 2022/0210062 A1* | 6/2022 | Brar | G06F 9/5077 |

FOREIGN PATENT DOCUMENTS

| | | | | |
|---|---|---|---|---|
| CN | 103391232 B | 11/2013 | | |
| CN | 104094230 A | 10/2014 | | |
| CN | 105262668 A | 1/2016 | | |
| RU | 2645595 C2 * | 2/2018 | | G06F 9/45533 |
| WO | WO-2005093560 A1 * | 10/2005 | | G06F 3/1203 |
| WO | WO-2009055556 A1 * | 4/2009 | | G06F 12/0866 |
| WO | WO-2015061731 A1 * | 4/2015 | | G06F 12/0815 |
| WO | WO-2015061731 A1 * | 4/2015 | | G06F 12/0815 |
| WO | 2019079960 A1 | 5/2019 | | |

OTHER PUBLICATIONS

Extended European Search Report and Written Opinion in European Patent Application No. 17929786.6 dated Apr. 29, 2021, 14 pages.

Pfefferele, Jonas et al., "A Hybrid I/O Virtualization Framework for RDMA-capable Network Interfaces", VEE '15, ACM Sigplan Notices, ACM, Mar. 14-15, 2015, pp. 17-30.

Tang, Hongwei et al., "IOMMU Para-Virtualization for Efficient and Secure DMA in Virtual Machines", KSII Transactions on Internet and Information Systems, vol. 10, No. 12, Dec. 31, 2016, pp. 5938-5963.

Notice of Allowance for U.S. Appl. No. 15/716,890, dated May 25, 2022.

Office Action for U.S. Appl. No. 15/716,890, dated Jun. 10, 2021.
Office Action for U.S. Appl. No. 15/716,890, dated Nov. 27, 2020.
Office Action for U.S. Appl. No. 17/945,455, dated Jan. 20, 2023.

"Architecting a VMware vCloud NFV OpenStack Edition NFV Platform", Reference Architecture, Version 2.0, 2017.

"VMware Offers Communications Service Providers the Fastest Path to OpenStack for Network Functions Virtualization", News Releases, Sep. 12, 2017; retrieved online via https://news.vmware.com/releases/vmware-offers-communications-service-providers-the-fastest-path-to-openstack-for-network-functions-virtualization on Sep. 14, 2022.

"VMware vCloud NFV The name of the base system (platform)", https://tadviser.eom/index.php/Product:VMware_vCloud_NFV, Aug. 17, 2022.

Extended European Search Report from European Patent Application No. 23167719.6 dated Jul. 5, 2023, 13 pgs.

"Network Functions Virtualisation (NFV); Acceleration Technologies; IFA 001: Overview & Use Cases;", ETSI GS IFA 001 V0.6.0, Jul. 2015, 50pgs.

"Network Functions Virtualisation; Part 1: Infrastructure Architecture; Sub-part 4: Architecture of the Hypervisor Domain", GS NFV INF .03 V0.0.2, Jan. 2013, 34 pgs.

* cited by examiner

HARDWARE ASSISTED VIRTUAL SWITCH

CROSS-REFERENCE TO RELATED APPLICATION

This application is a national stage application under 35 U.S.C. § 371 of PCT International Application Serial No. PCT/CN2017/107442, filed on Oct. 24, 2017 and entitled "HARDWARE ASSISTED VIRTUAL SWITCH," which is hereby incorporated by reference herein in its entirety.

FIELD OF THE SPECIFICATION

This disclosure relates in general to the field of cloud computing, and more particularly, though not exclusively, to a system and method for a hardware assisted virtual switch.

BACKGROUND

In some modern data centers, the function of a device or appliance may not be tied to a specific, fixed hardware configuration. Rather, processing, memory, storage, and accelerator functions may in some cases be aggregated from different locations to form a virtual "composite node." A contemporary network may include a data center hosting a large number of generic hardware server devices, contained in a server rack for example, and controlled by a hypervisor. Each hardware device may run one or more instances of a virtual device, such as a workload server or virtual desktop.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
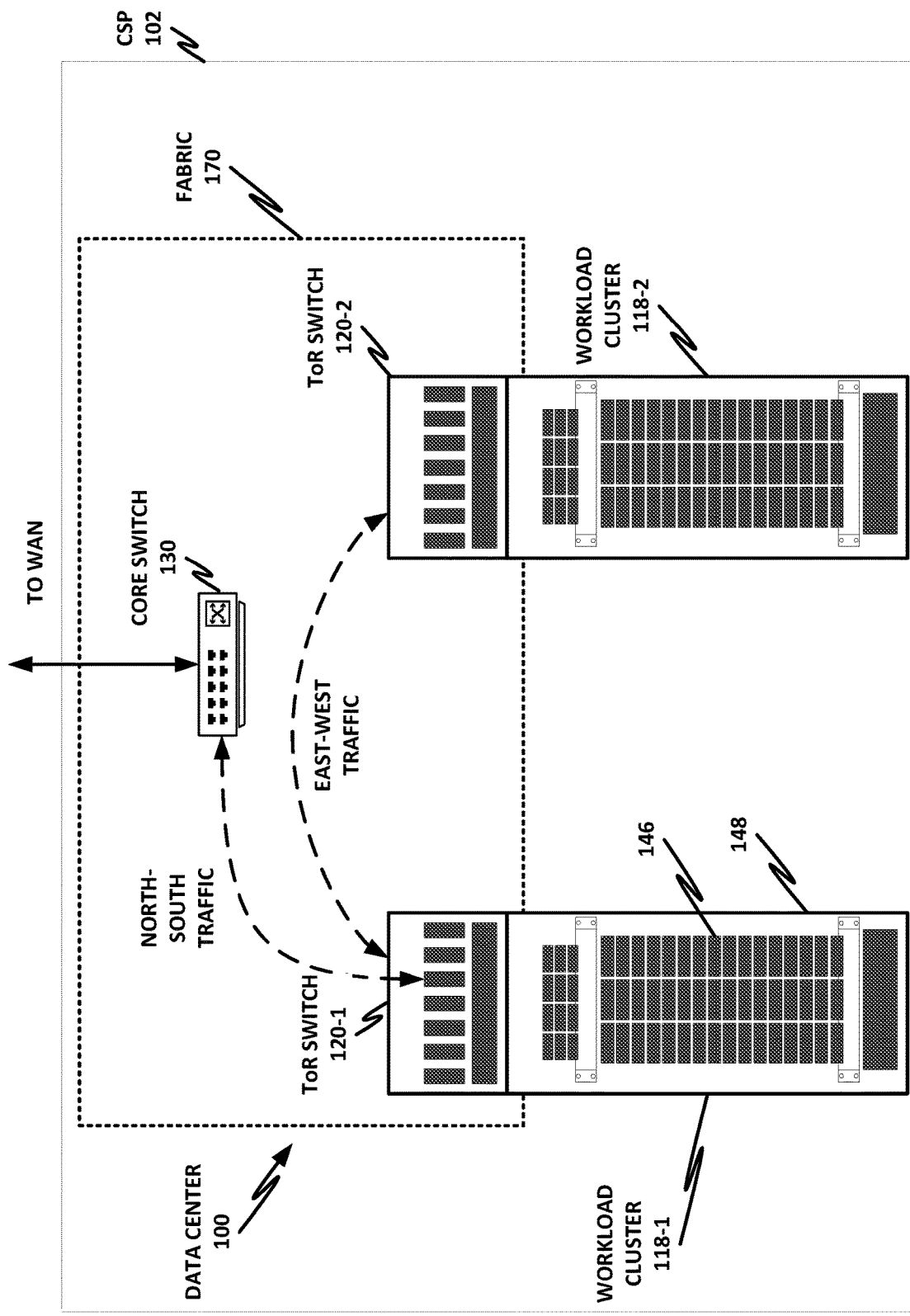
FIG. 1 is a block diagram of selected components of a data center with network connectivity, according to one or more examples of the present specification.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

A contemporary computing platform, such as a hardware platform provided by Intel® or similar, may include a capability for monitoring device performance and making decisions about resource provisioning. For example, in a large data center such as may be provided by a cloud service provider (CSP), the hardware platform may include rack-mounted servers with compute resources such as processors, memory, storage pools, accelerators, and other similar resources. As used herein, "cloud computing" includes network-connected computing resources and technology that enables ubiquitous (often worldwide) access to data, resources, and/or technology. Cloud resources are generally characterized by great flexibility to dynamically assign resources according to current workloads and needs. This can be accomplished, for example, via virtualization, wherein resources such as hardware, storage, and networks are provided to a virtual machine (VM) via a software abstraction layer, and/or containerization, wherein instances of network functions are provided in "containers" that are separated from one another, but that share underlying operating system, memory, and driver resources.

In the modern data center, and particularly in the context of a CSP, data paths are often highly optimized. Because a data center may include hardware devices that are separate from one another and that are connected by a high-speed fabric, it is often necessary to ensure that the fabric can operate at speeds similar to or faster than local interconnects on an older monolithic server device wherein all the hardware may be collocated.

For example, a CSP may provide a number of virtual machines to its customers, and its business model may include selling central processing unit (CPU) cores, CPU core time, memory, network bandwidth, storage, and defined service level agreements of bandwidth and interoperability between these to its end users. The client can run applications on these hardware resources to provide their own network services, as though they were maintaining their own individual server ecosystems. These applications may be chained together in a service chain running on various virtual machines as part of a "tenant" of a server cloud.

The various VMs that the customer runs may all be interconnected via a virtual switch (vSwitch), which in existing software-only systems may include an application running on the host. The application itself can use anywhere from 1 to 8 cores depending on the workload assigned to it, meaning that those 1 to 8 cores per physical server can no longer be sold to end users. They are simply consumed as overhead.

To reduce the overhead in compute cores consumed by vSwitch, it is possible to provide the vSwitch in hardware. For example, an existing hardware driver for a network interface card (NIC) that would be used in a physical switch can be integrated into a rackmount server. However, rather than physically coupling to physical Ethernet switches, the chip is simply programmed to provide switching between virtual ports that exist on VMs on the server. While the use of a hardware-only vSwitch can indeed eliminate the need to consume one or more cores to provide a software vSwitch, this often comes at the cost of flexibility. A virtual machine running on a host of the hardware-only vSwitch may need to load an appropriate driver for that hardware, similar to how the operating system kernel on a standalone server using a hardware network card would need a driver for that network card. This inhibits the ability to live migrate VMs between dissimilar platforms. For example, a VM running on a system with such a hardware-only vSwitch could be live migrated to an identical hardware platform having an identical hardware vSwitch, but migrating that VM to a hardware platform having a different hardware-only vSwitch would require (at a minimum) reloading the drivers and updating the configuration, possibly even requiring a reboot of the server appliance. Migrating a VM from a hardware platform providing a hardware-only vSwitch to a platform that provides only a software vSwitch could be even more difficult and require even more changes to the configuration.

The present specification describes a system and method for providing a hardware assisted vSwitch that realizes the benefits of a hardware vSwitch by abstracting certain operations into a vHost net driver that can be backward compatible with software-only vSwitches, and can also take advantage of various hardware vSwitches regardless of their specific identities.

For example, certain existing solutions connect the vSwitch hardware directly into a guest VM or container using single root input/output virtualization (SR-IOV). The guest is given an SR-IOV virtual function (VF) using "virtual function (VF) passthrough." As described above, SR-IOV requires a hardware specific driver in the guest to be run on the passthrough device, and is limited in its ability to forward packets between guests to a layer 2 semantic, based on only media access control (MAC) addresses. VF passthrough breaks the ability for live migration.

In some cases, a solution can be provided utilizing SR-IOV and a hardware vSwitch to replace the layer 2 forwarding of SR-IOV. This approach may be referred to as "vSwitch-controlled SR-IOV." In this mode, vSwitch forwarding is applied to traffic, but a VF passthrough is still required to connect VM guest applications to the network. This approach still requires a VF to be passed through, for example, in Quick Emulator (QEMU), and thus is also not compatible with live migration.

Thus, a distinction between SR-IOV and the disclosure of the present specification is that instead of passing an entire VF into the guest, the hardware stays associated with the underlying host, and replaces the virtual descriptor rings (vrings) that may otherwise have been emulated in software in vHost. This offloads the fast data path connecting the VM to the hardware offloaded vSwitch (in other words, the work that often consumes large numbers of CPU cycles), but leaves the control plane for this connectivity in software.

Stated differently, existing vSwitches include a virtual function that presents a standardized network interface to the guest (virtio). Software in the guest and software in the host communicate as though they were two ends of the same wire. A Linux host may include a vHost acceleration layer that can consume one or more cores just to optimally handle the data paths of the virtio backend. The vHost thread may, for example, get guest memory address space from the hypervisor, and watch this address space for doorbells, to see when traffic is ready to be sent, and then send and receive traffic. The thread may also ring an interrupt when the operation completes. This provides a highly-optimized software vSwitch, at the cost of one or more cores.

The present specification provides a hardware-assisted vSwitch in which vHost functions may be offloaded to a hardware device on the host device. The host hypervisor may then not need to allocate a vHost thread. Instead, the hardware vHost receives the address mapping, and it programs those mappings into its hardware using, for example, an existing IOMMU. The hardware vHost maps the guest private address (GPA) to the host private address (HPA), and programs this into the IOMMU.

Note that the hardware vHost may be specific to the network software backend on the host, and is thus able to present an abstracted interface to all guests, eliminating the need for guests to provide their own kernel-level drivers for the networking hardware. Rather, the guest can simply use the standard emulated driver (virtio). This means that a host device with a hardware vSwitch appears identical to a host with a software vSwitch, as they use the identical virtio emulated driver. Furthermore, because the hardware vHost is specific to the vSwitch hardware IP, VMs can be live migrated between hosts with different hardware IP blocks, or between hosts with software vSwitches and hardware vSwitches. The VM itself can remain agnostic of what kind of vSwitch the host is running.

The hardware vHost can read data directly between the host and guest. Instead of a software thread reading and writing data (software vHost), the hardware vHost reads and writes data, and also handles doorbells and interrupts.

Some older versions of the virtio-net driver in the guest may not be fully compatible with a hardware vHost. For example, a relay mechanism may support the ability to convert from a pure software 'notify' that a new frame is ready to send. Some cycles may still be consumed in operating the relay, but the cycles consumed in this operation are much fewer than the cycles that would be consumed in a software-only vSwitch. Furthermore, this system does not break the hypervisor construct, thus maintaining backward compatibility. CPU overhead is significantly reduced, while functions available in software-only vSwitches such as live migration are preserved. Advantageously, this system provides a hardware vSwitch, but eliminates the need of having the hardware implement the control plane.

Embodiments of the present specification use virtio-net as the host interface. Virtio-net is an existing open source standard paravirtualized driver. Thus, existing hardware platforms have already been designed to conform to the virtio-net driver's existing behavior. Advantageously, existing virtio-net drivers in the guest VM can be used unmodified. The capabilities supported by the hardware may be dependent on the version of virtio-net driver provided in the guest.

Embodiments of this specification also provide "vHost offload." vHost offload does not pass through a VF device into the guest, but rather emulates the behavior of a software vHost, using the VFs that remain in the host. The software vHost instantiates a set of emulated cues that can be passed to a VM at instantiation to implement the back end of the virtio-net driver. vHost offload may replace these emulated cues with hardware cues from a virtio-net VF. Thus, the vHost control plane (e.g., providing the ability to negotiate and live migrate the system) stays in the software.

By way of nonlimiting example, vHost offload may support the following features:

Virtio-net Notify Kick Relay. When a virtio-net driver is used in the guest, it may choose to notify the backend of new events by using a fast event path (eventfd) kick via programmed input/output (PIO). The kick is received on the backend side just as in an emulated vHost, and in this case the kick may be translated into a hardware write on the vHost. This enables virtio-net notifies with hardware based cues.

Virtio-net Interrupt Request (IRQ) Relay in Contemporary Linux-Based Systems. For both versions of virtio-net, the IRQ is filtered through QEMU just as the notify kick. This IRQ relay translates the hardware interrupt in the host into a software fast interrupt request path (IRQFD) in the guest.

Guest Data Address Remapping. Virtio-net guests may write into their descriptors addresses pointing to the data in their own guest physical address (GPA) space. In a software vHost, the GPA is translated into a host physical address (HPA) using a mapping that comes from QEMU. However, in the vHost offload approach, the mapping is populated into the input/output memory management unit (IOMMU) to allow hardware to address the data by GPA, finding it in the right location at the HPA.

Live Migration Handling. When a live migration is triggered, the program state of which pages are in use may be transferred to QEMU so that it can reset the mapping and the destination host. All descriptor ring states held in the device (i.e., not in host memory) should also be transmitted. Thus, all the active pages are dirtied and swapped out of the cache, and the full device state is carried in alongside the VM, so that the current state can be transferred during migration. On the destination side, the new hardware platform may have the capability to load the current running state of the vrings and warm start from where the source rings left off.

vHost offload provides a relay type of approach, with some optimizations provided because the descriptor queue structure is the same on both sides of the relay. Interrupts may be relayed as there may not be another mechanism to pass interrupts directly into a virtualized guest without VF passthrough. Optimizations provided by vHost offload include, by way of nonlimiting example:

Data Zero Copy. For RX and TX, the IOMMU is used to map GPA into HPA, so that the hardware can access guest pages and read or write data directly into these pages. In some embodiments, it may be necessary for the guest's memory to be pinned in the host memory (either the entire memory space, or at a minimum the space used for virtio-net). This may be particularly true for guests that run Data Plane Developer Kit (DPDK) with HugePages, while for regular kernel guests, this may be a novel method of instantiating guests on the host.

Single Descriptor Table, Avail, and Used Rings. A relay may support the ability to convert from two different descriptor ring structures, although this may involve performing the conversion in software, thus consuming CPU cycles. Using the present approach, the descriptor table and rings may be accessed directly between the guest and the underlying hardware.

Guest Direct Hardware Kick. In virtio-net, the guest may directly kick the hardware by writing the "avail" index via the MMIO.

Interrupt Remapping. By way of instructions provided in software, an interrupt remapping table may be provided in the IOMMU, enabling vHost offload hardware to pass interrupts into a virtualized guest. By leveraging the interrupt remapping feature of IOMMU (e.g., posted interrupt), a hypervisor does not intervene in the relay.

A system and method for a hardware assisted virtual switch will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a block diagram of selected components of a data center with connectivity to network 100 of a cloud service provider (CSP) 102, according to one or more examples of the present specification. CSP 102 may be, by way of nonlimiting example, a traditional enterprise data center, an enterprise "private cloud," or a "public cloud," providing services such as infrastructure as a service (IaaS), platform as a service (PaaS), or software as a service (SaaS).

CSP 102 may provision some number of workload clusters 118, which may be clusters of individual servers, blade servers, rackmount servers, or any other suitable server topology. In this illustrative example, two workload clusters, 118-1 and 118-2 are shown, each providing rackmount servers 146 in a chassis 148.

In this illustration, workload clusters 118 are shown as modular workload clusters conforming to the rack unit ("U") standard, in which a standard rack, 19 inches wide, may be built to accommodate 42 units (42U), each 1.75 inches high and approximately 36 inches deep. In this case, compute resources such as processors, memory, storage, accelerators, and switches may fit into some multiple of rack units from one to 42.

Each server 146 may host a standalone operating system and provide a server function, or servers may be virtualized, in which case they may be under the control of a virtual machine manager (VMM), hypervisor, and/or orchestrator, and may host one or more virtual machines, virtual servers, or virtual appliances. These server racks may be collocated in a single data center, or may be located in different geographic data centers. Depending on the contractual agreements, some servers 146 may be specifically dedicated to certain enterprise clients or tenants, while others may be shared.

The various devices in a data center may be connected to each other via a switching fabric 170, which may include one or more high speed routing and/or switching devices. Switching fabric 170 may provide both "north-south" traffic (e.g., traffic to and from the wide area network (WAN), such as the internet), and "east-west" traffic (e.g., traffic across the data center). Historically, north-south traffic accounted for the bulk of network traffic, but as web services become more complex and distributed, the volume of east-west traffic has risen. In many data centers, east-west traffic now accounts for the majority of traffic.

Furthermore, as the capability of each server 146 increases, traffic volume may further increase. For example, each server 146 may provide multiple processor slots, with each slot accommodating a processor having four to eight cores, along with sufficient memory for the cores. Thus, each server may host a number of VMs, each generating its own traffic.

To accommodate the large volume of traffic in a data center, a highly capable switching fabric 170 may be provided. Switching fabric 170 is illustrated in this example as a "flat" network, wherein each server 146 may have a direct connection to a top-of-rack (ToR) switch 120 (e.g., a "star" configuration), and each ToR switch 120 may couple to a core switch 130. This two-tier flat network architecture is shown only as an illustrative example. In other examples, other architectures may be used, such as three-tier star or leaf-spine (also called "fat tree" topologies) based on the "Clos" architecture, hub-and-spoke topologies, mesh topologies, ring topologies, or 3-D mesh topologies, by way of nonlimiting example.

The fabric itself may be provided by any suitable interconnect. For example, each server 146 may include an Intel® Host Fabric Interface (HFI), a network interface card (NIC), or other host interface. The host interface itself may couple to one or more processors via an interconnect or bus, such as PCI, PCIe, or similar, and in some cases, this interconnect bus may be considered to be part of fabric 170.

The interconnect technology may be provided by a single interconnect or a hybrid interconnect, such as where PCIe provides on-chip communication, 1 Gb or 10 Gb copper Ethernet provides relatively short connections to a ToR switch 120, and optical cabling provides relatively longer connections to core switch 130. Interconnect technologies include, by way of nonlimiting example, Intel® Omni-Path™, TrueScale™, Ultra Path Interconnect (UPI) (formerly called QPI or KTI), FibreChannel, Ethernet, Fibre-Channel over Ethernet (FCoE), InfiniBand, PCI, PCIe, or fiber optics, to name just a few. Some of these will be more suitable for certain deployments or functions than others, and selecting an appropriate fabric for the instant application is an exercise of ordinary skill.

Note however that while high-end fabrics such as Omni-Path™ are provided herein by way of illustration, more generally, fabric 170 may be any suitable interconnect or bus for the particular application. This could, in some cases, include legacy interconnects like local area networks (LANs), token ring networks, synchronous optical networks (SONET), asynchronous transfer mode (ATM) networks, wireless networks such as WiFi and Bluetooth, "plain old telephone system" (POTS) interconnects, or similar. It is also expressly anticipated that in the future, new network technologies will arise to supplement or replace some of those listed here, and any such future network topologies and technologies can be or form a part of fabric 170.

In certain embodiments, fabric 170 may provide communication services on various "layers," as originally outlined in the OSI seven-layer network model. In contemporary practice, the OSI model is not followed strictly. In general terms, layers 1 and 2 are often called the "Ethernet" layer (though in large data centers, Ethernet has often been supplanted by newer technologies). Layers 3 and 4 are often referred to as the transmission control protocol/internet protocol (TCP/IP) layer (which may be further subdivided into TCP and IP layers). Layers 5-7 may be referred to as the "application layer." These layer definitions are disclosed as a useful framework, but are intended to be nonlimiting.

Figure 2:
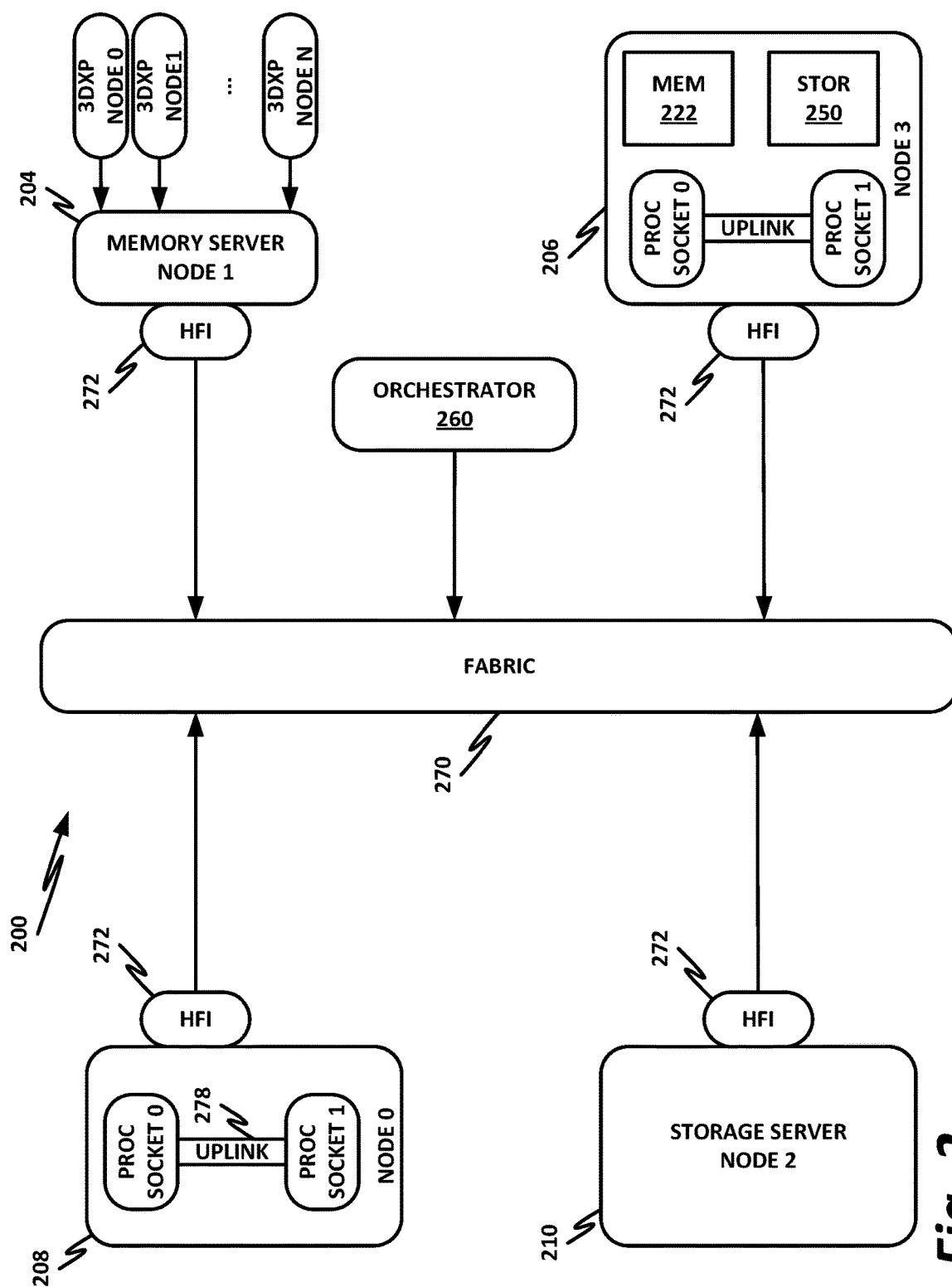
FIG. 2 is a block diagram of selected components of an end-user computing device, according to one or more examples of the present specification.

FIG. 2 is a block diagram of a data center 200 according to one or more examples of the present specification. Data center 200 may be, in various embodiments, the same as network 100 of FIG. 1, or may be a different data center. Additional views are provided in FIG. 2 to illustrate different aspects of data center 200.

In this example, a fabric 270 is provided to interconnect various aspects of data center 200. Fabric 270 may be the same as fabric 170 of FIG. 1, or may be a different fabric. As above, fabric 270 may be provided by any suitable interconnect technology. In this example, Intel® Omni-Path™ is used as an illustrative and nonlimiting example.

As illustrated, data center 200 includes a number of logic elements forming a plurality of nodes. It should be understood that each node may be provided by a physical server, a group of servers, or other hardware. Each server may be running one or more virtual machines as appropriate to its application.

Node 0 208 is a processing node including a processor socket 0 and processor socket 1. The processors may be, for example, Intel® Xeon™ processors with a plurality of cores, such as 4 or 8 cores. Node 0 208 may be configured to provide network or workload functions, such as by hosting a plurality of virtual machines or virtual appliances.

Onboard communication between processor socket 0 and processor socket 1 may be provided by an onboard uplink 278. This may provide a very high speed, short-length interconnect between the two processor sockets, so that virtual machines running on node 0 208 can communicate with one another at very high speeds. To facilitate this communication, a virtual switch (vSwitch) may be provisioned on node 0 208, which may be considered to be part of fabric 270.

Node 0 208 connects to fabric 270 via an HFI 272. HFI 272 may connect to an Intel® Omni-Path™ fabric. In some examples, communication with fabric 270 may be tunneled, such as by providing UPI tunneling over Omni-Path™.

Because data center 200 may provide many functions in a distributed fashion that in previous generations were provided onboard, a highly capable HFI 272 may be provided. HFI 272 may operate at speeds of multiple gigabits per second, and in some cases may be tightly coupled with node 0 208. For example, in some embodiments, the logic for HFI 272 is integrated directly with the processors on a system-on-a-chip. This provides very high speed communication between HFI 272 and the processor sockets, without the need for intermediary bus devices, which may introduce additional latency into the fabric. However, this is not to imply that embodiments where HFI 272 is provided over a traditional bus are to be excluded. Rather, it is expressly anticipated that in some examples, HFI 272 may be provided on a bus, such as a PCIe bus, which is a serialized version of PCI that provides higher speeds than traditional PCI. Throughout data center 200, various nodes may provide different types of HFIs 272, such as onboard HFIs and plug-in HFIs. It should also be noted that certain blocks in a system on a chip may be provided as intellectual property (IP) blocks that can be "dropped" into an integrated circuit as a modular unit. Thus, HFI 272 may in some cases be derived from such an IP block.

Note that in "the network is the device" fashion, node 0 208 may provide limited or no onboard memory or storage. Rather, node 0 208 may rely primarily on distributed services, such as a memory server and a networked storage server. Onboard, node 0 208 may provide only sufficient memory and storage to bootstrap the device and get it communicating with fabric 270. This kind of distributed architecture is possible because of the very high speeds of contemporary data centers, and may be advantageous because there is no need to over-provision resources for each node. Rather, a large pool of high-speed or specialized memory may be dynamically provisioned between a number of nodes, so that each node has access to a large pool of resources, but those resources do not sit idle when that particular node does not need them.

In this example, a node 1 memory server 204 and a node 2 storage server 210 provide the operational memory and storage capabilities of node 0 208. For example, memory server node 1 204 may provide remote direct memory access (RDMA), whereby node 0 208 may access memory resources on node 1 204 via fabric 270 in a DMA fashion, similar to how it would access its own onboard memory. The memory provided by memory server 204 may be traditional memory, such as double data rate type 3 (DDR3) dynamic random access memory (DRAM), which is volatile, or may be a more exotic type of memory, such as a persistent fast memory (PFM) like Intel® 3D Crosspoint™ (3 DXP), which operates at DRAM-like speeds, but is nonvolatile.

Similarly, rather than providing an onboard hard disk for node 0 208, a storage server node 2 210 may be provided. Storage server 210 may provide a networked bunch of disks (NBOD), PFM, redundant array of independent disks (RAID), redundant array of independent nodes (RAIN), network attached storage (NAS), optical storage, tape drives, or other nonvolatile memory solutions.

Thus, in performing its designated function, node 0 208 may access memory from memory server 204 and store results on storage provided by storage server 210. Each of these devices couples to fabric 270 via a HFI 272, which provides fast communication that makes these technologies possible.

By way of further illustration, node 3 206 is also depicted. Node 3 206 also includes a HFI 272, along with two processor sockets internally connected by an uplink. However, unlike node 0 208, node 3 206 includes its own onboard memory 222 and storage 250. Thus, node 3 206 may be configured to perform its functions primarily onboard, and may not be required to rely upon memory server 204 and storage server 210. However, in appropriate circumstances, node 3 206 may supplement its own onboard memory 222 and storage 250 with distributed resources similar to node 0 208.

The basic building block of the various components disclosed herein may be referred to as "logic elements." Logic elements may include hardware (including, for example, a software-programmable processor, an ASIC, or an FPGA), external hardware (digital, analog, or mixed-signal), software, reciprocating software, services, drivers, interfaces, components, modules, algorithms, sensors, components, firmware, microcode, programmable logic, or objects that can coordinate to achieve a logical operation. Furthermore, some logic elements are provided by a tangible, non-transitory computer-readable medium having stored thereon executable instructions for instructing a processor to perform a certain task. Such a non-transitory medium could include, for example, a hard disk, solid state memory or disk, read-only memory (ROM), persistent fast memory (PFM) (e.g., Intel® 3D Crosspoint™), external storage, redundant array of independent disks (RAID), redundant array of independent nodes (RAIN), network-attached storage (NAS), optical storage, tape drive, backup system, cloud storage, or any combination of the foregoing by way of nonlimiting example. Such a medium could also include instructions programmed into an FPGA, or encoded in hardware on an ASIC or processor.

Figure 3:
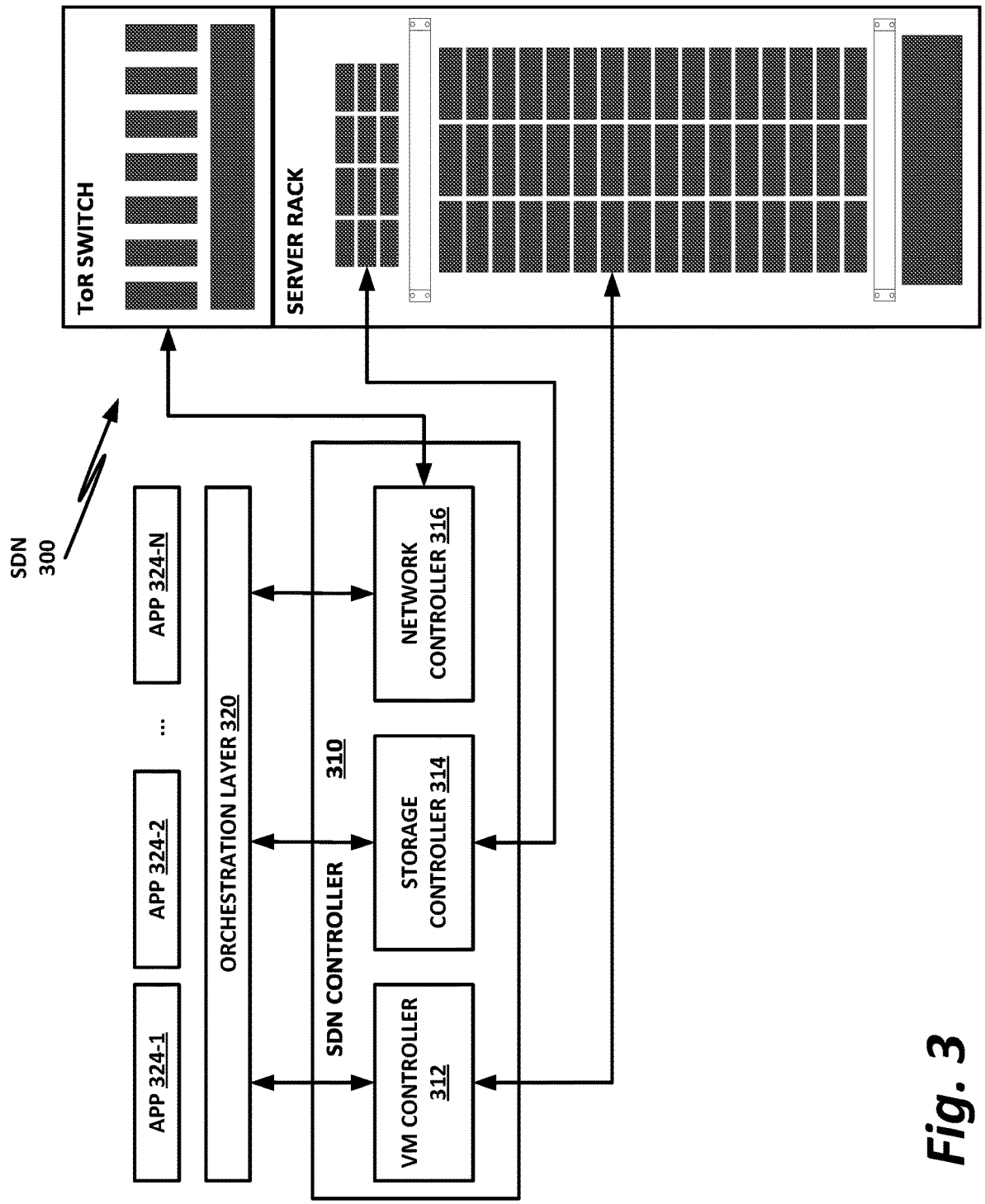
FIG. 3 is a block diagram of a software-defined network (SDN), according to one or more examples of the present specification.

FIG. 3 is a block diagram of a software-defined network 300, according to one or more examples of the present specification. In software defined networking (SDN), a single configuration utility (often a graphical interface or browser interface) may be used to manage network resources at a high level, with very little manual human intervention into the details of the network. SDN may provide a data plane that is separate from a control plane, to separate management functions from data functions. Another benefit of SDNs is that they may be based on open standards, thus providing portability between systems, and alleviating issues of vendor lock-in.

SDN 300 is controlled by an SDN controller 310, which may include, for example, a VM controller 312, a storage controller 314, and a network controller 316. Other SDN controller functions may also be provided in other embodiments, and not every embodiments is required to have the foregoing elements. SDN controller 310 provides an orchestration layer 320. The orchestration layer may employ an open orchestration protocol, such as the OpenStack cloud operating system.

Orchestration layer 320 may include various plugin components that can be used as interfaces to control data center resources. These plugins may interact with orchestration layer 320 via a set of standardized and open APIs, thus enabling different vendors to provide different plugins. In many cases, data center resources can all be managed via a single graphical interface provided by orchestration layer 320. For example, OpenStack currently provides a dashboard called "Horizon," which provides a monolithic interface that enables an administrator to fully configure and administer a data center.

In some embodiments, orchestration layer 320 provides a northbound API, on which may be instantiated various applications or functions, such as applications 324-1-324-N illustrated here. Each application 324 may be provided on a discrete virtual network device or container (referred to herein generically as "network devices"). Applications 324 may be configured to perform a variety of network functions, such as, by way of nonlimiting example, load-balancing, firewall, deep packet inspection (DPI), DNS, antivirus, or any other suitable network function. The particular arrangement of interconnections between network devices 330 and from network devices 330 to host devices 340 may be determined by the particular network configuration and needs. Thus, the specific configuration of FIG. 3 should be understood to be an illustrative example only.

Orchestration layer may provide communication protocols, including in some embodiments OpenFlow. OpenFlow centralizes networking intelligence into an SDN controller such as SDN controller 310. Using OpenFlow, switches and routers do not need to use prior data exchange protocols to learn about the network topology and other environmental factors. These topology data are replicated across all switches and routers in the network, and each one maintains forwarding tables. In contrast, an OpenFlow controller (which may be, for example, a function of network controller 316) provides centralized network management that maintains the network state in a central repository. Network controller 316 can then update forwarding tables as the network topology evolves or changes, generate a forwarding table for each switch or router, and push them out to network devices as necessary. This realizes separation of the control plane and the data plane. Individual network devices may implement the OpenFlow API by adding an OpenFlow shim layer that translates OpenFlow API function calls into native function calls for the switch or router.

Note that while this illustration shows a single SDN controller 310, in large data centers, an orchestration controller may control a number of distributed SDN controllers. In some embodiments, SDN controllers and orchestrators can communicate with one another to remain synchronization and state information via a sideband, such as a separate, lower-speed Ethernet connection.

Figure 4:
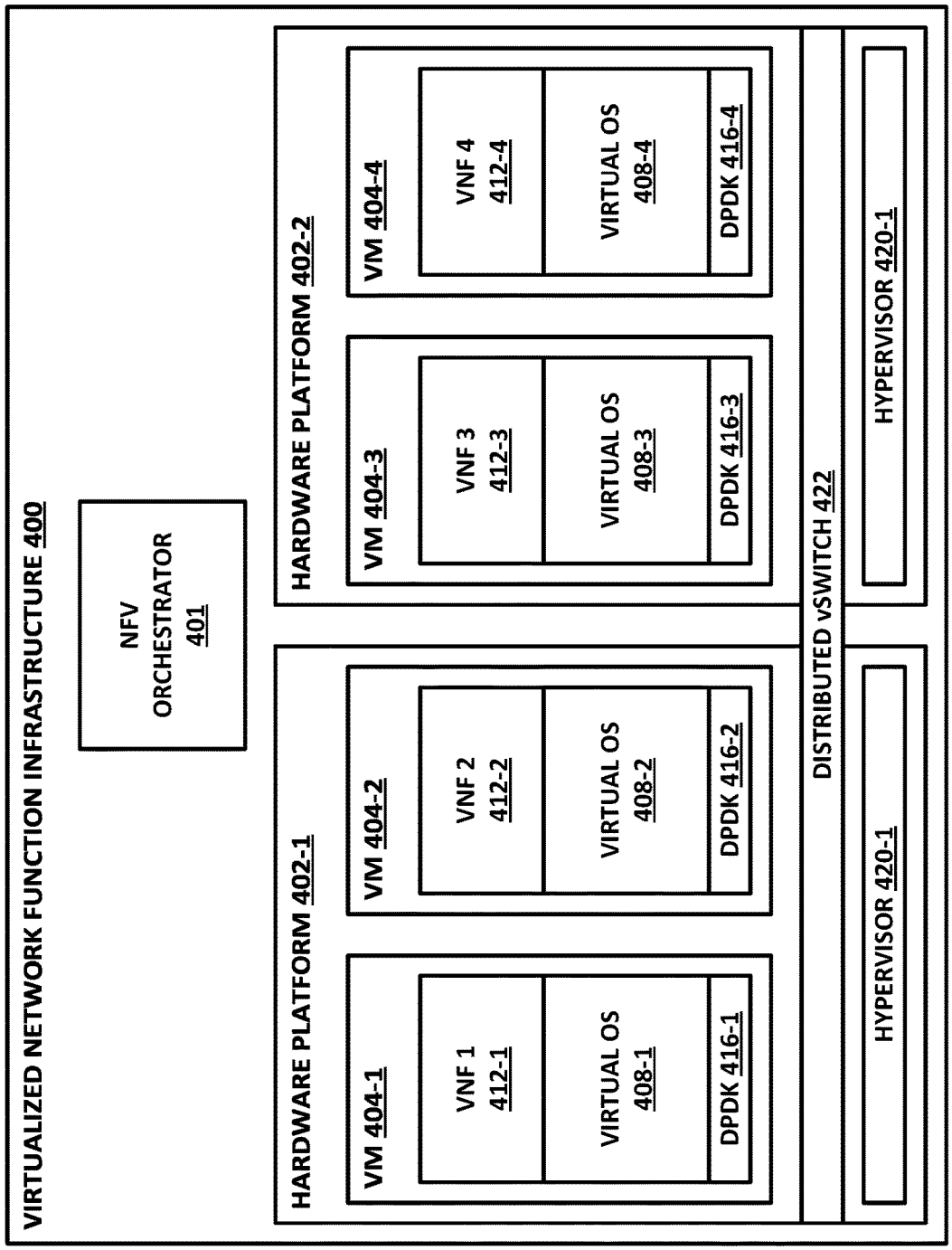
FIG. 4 is a block diagram of a network function virtualization (NFV) architecture, according to one or more examples of the present specification.

FIG. 4 is a block diagram of a network function virtualization (NFV) infrastructure 400 according to one or more examples of the present specification. NFV is an aspect of network virtualization that is generally considered distinct from, but that can still interoperate with SDN. For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, virtual network functions (VNFs) can be provisioned ("spun up") or removed ("spun down") to meet network demands. For example, in times of high load, more load balancer VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 400. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

Like SDN, NFV is a subset of network virtualization. Thus, the network as illustrated in FIG. 4 may be defined instead of or in addition to the network of FIG. 3. In other words, certain portions of the network may rely on SDN, while other portions (or the same portions) may rely on NFV.

In the example of FIG. 4, an NFV orchestrator 401 manages a number of the VNFs 412 running on an NFVI 400. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 401 a valuable system resource. Note that NFV orchestrator 401 may provide a browser-based or graphical configuration interface, and in some embodiments may be integrated with SDN orchestration functions.

Note that NFV orchestrator 401 itself may be virtualized (rather than a special-purpose hardware appliance). NFV orchestrator 401 may be integrated within an existing SDN system, wherein an operations support system (OSS) manages the SDN. This may interact with cloud resource management systems (e.g., OpenStack) to provide NFV orchestration. An NFVI 400 may include the hardware, software, and other infrastructure to enable VNFs to run. This may include a hardware platform 402 on which one or more VMs 404 may run. For example, hardware platform 402-1 in this example runs VMs 404-1 and 404-2. Hardware platform 402-2 runs VMs 404-3 and 404-4. Each hardware platform may include a hypervisor 420, virtual machine manager (VMM), or similar function, which may include and run on a native (bare metal) operating system, which may be minimal so as to consume very few resources.

Hardware platforms 402 may be or comprise a rack or several racks of blade or slot servers (including, e.g., processors, memory, and storage), one or more data centers, other hardware resources distributed across one or more geographic locations, hardware switches, or network interfaces. An NFVI 400 may also include the software architecture that enables hypervisors to run and be managed by NFV orchestrator 401.

Running on NFVI 400 are a number of VMs 404, each of which in this example is a VNF providing a virtual service appliance. Each VM 404 in this example includes an instance of the Data Plane Development Kit (DVDK), a virtual operating system 408, and an application providing the VNF 412.

Virtualized network functions could include, as nonlimiting and illustrative examples, firewalls, intrusion detection systems, load balancers, routers, session border controllers, deep packet inspection (DPI) services, network address translation (NAT) modules, or call security association.

The illustration of FIG. 4 shows that a number of VNFs 404 have been provisioned and exist within NFVI 400. This figure does not necessarily illustrate any relationship between the VNFs and the larger network, or the packet flows that NFVI 400 may employ.

The illustrated DPDK instances 416 provide a set of highly-optimized libraries for communicating across a virtual switch (vSwitch) 422. Like VMs 404, vSwitch 422 is provisioned and allocated by a hypervisor 420. The hypervisor uses a network interface to connect the hardware platform to the data center fabric (e.g., an HFI). This HFI may be shared by all VMs 404 running on a hardware platform 402. Thus, a vSwitch may be allocated to switch traffic between VMs 404. The vSwitch may be a pure software vSwitch (e.g., a shared memory vSwitch), which may be optimized so that data are not moved between memory locations, but rather, the data may stay in one place, and pointers may be passed between VMs 404 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 422 is illustrated, wherein vSwitch 422 is shared between two or more physical hardware platforms 402.

Figure 5:
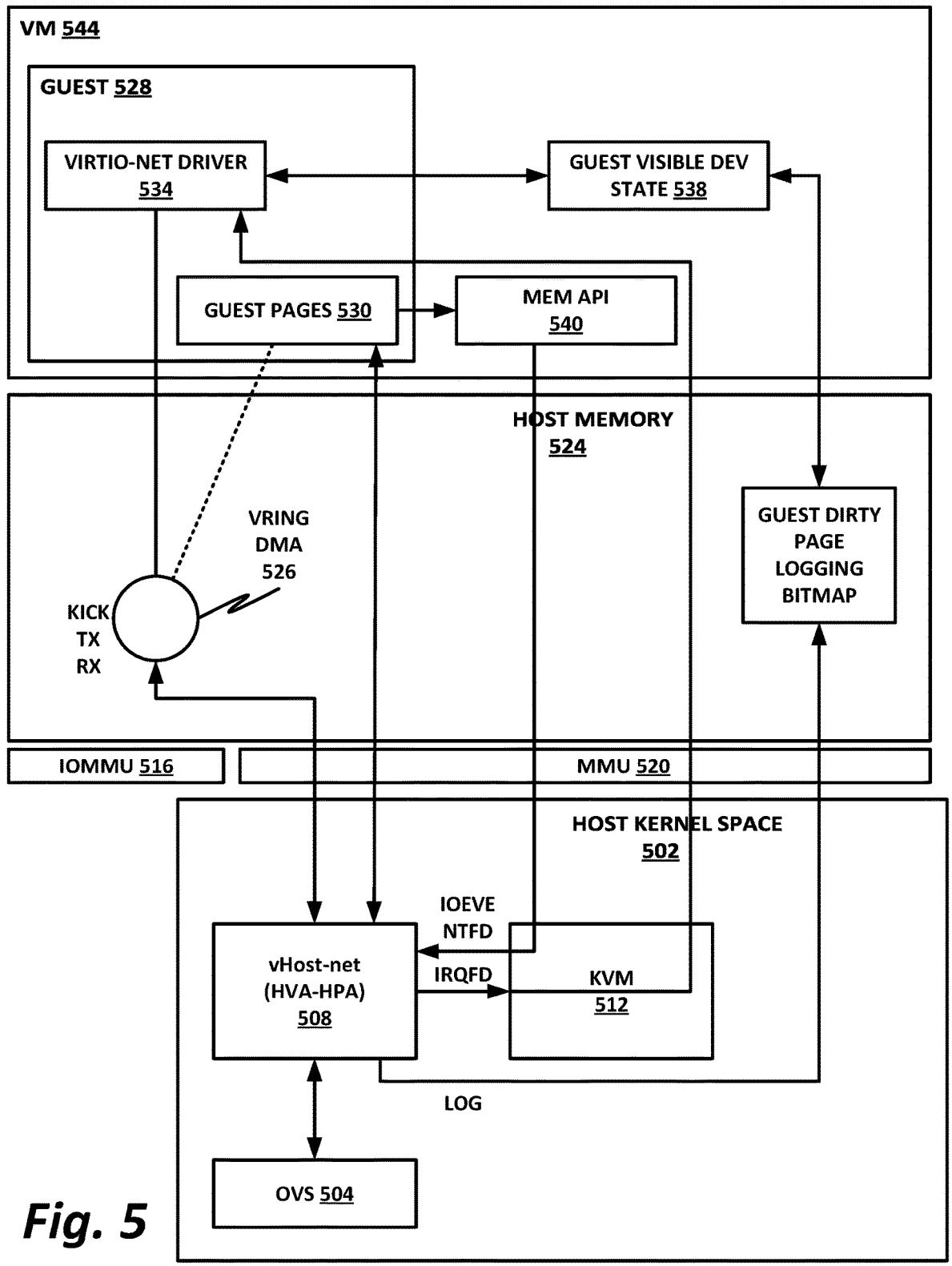
FIG. 5 is a block diagram of a virtualized network function infrastructure (VNFI), according to one or more examples of the present specification.

FIG. 5 is a block diagram of a virtualized network function infrastructure (VNFI), according to one or more examples of the present specification. Note that the illustration of FIG. 5 may in some embodiments illustrate a more detailed view of certain aspects of FIG. 4. In this case, a host hardware platform includes a host kernel space 502, a memory management unit (MMU) 520, an IOMMU 516, and host physical memory 524. vHost provisions a VM 544 that will map its guest physical memory (GPM) to host physical memory (HPM).

The embodiment of FIG. 5 illustrates a software-only vSwitch, and is provided here to illustrate that the hardware assisted vSwitch of the present specification can be migrated to systems that employ software-only vSwitches.

In this embodiment, an open vSwitch (OVS) 504 is provided. OVS is an open source implementation of vSwitch for hardware virtualization environments, which supports multiple protocols and standards used in computer networks. This embodiment illustrates an example where the OVS is provided in software.

Host kernel space 502 also includes vHost-net 508, which may provide host virtual address (HVA) to HPA mapping via MMU 520. Finally, host kernel space 502 includes kernel virtual machine (KVM) 512 which provides standard KVM services, such as are provided in the standard Linux KVM. As discussed above, a virtual ring (vring) direct memory access (DMA) mechanism 526 may be provided. Signals such as kicks, TX, and RX may be provided by vHost-net 508 through MMU 520 via vring 526 to VM 544, which maps from memory access operations to guest pages 530 within guest 528. Guest 528 may also include its own virtio-net driver 534. VM 544 also includes a memory application program interface (MAPI) which communicates with vHost-net 508 to provide GPA mapping for guest 528. VM 544 also maintains guest visible device states 538 which may be synchronized with a logging function of host kernel space 502 via KVM 512.

Figure 6:
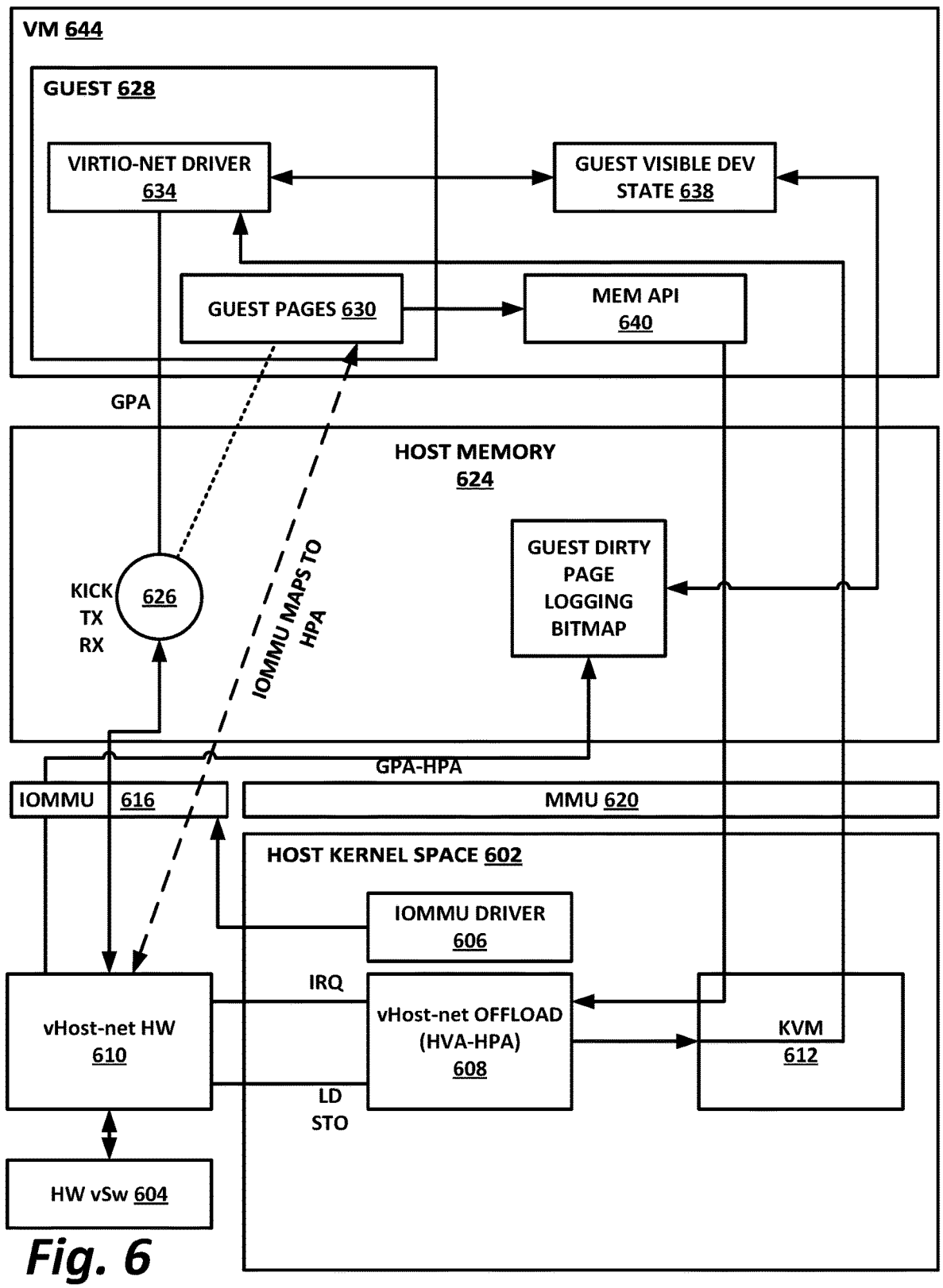
FIG. 6 illustrates a VNFI, according to one or more examples of the present specification.

FIG. 6 illustrates a VNFI, according to one or more examples of the present specification. In the example of FIG. 6, many aspects are substantially similar to the software-only vSwitch of FIG. 5. However, FIG. 6 provides a hardware assisted vSwitch with vHost offload into the hardware.

Specifically, this VNFI includes a hardware (HW) vSwitch 604 with exact-match cache (EMC) capability. HW vSwitch 604 may be a hardware IP block, for example, a circuit similar or identical to the control hardware in a hardware switch or network interface device. In existing systems, VM 644 would require a specific driver to operate with HW vSwitch 604. But in this case, vHost-net hardware 610 provides the "driver," abstracting out any functionality specific to HW vSwitch 604, so that it can interact with guest 620 via standardized virtio-net driver 634. HW vSwitch 604 determines how to handle incoming packets, and is also provided in hardware in this example.

Similar to FIG. 5, FIG. 6 includes a host kernel space 602, a host memory 624, an MMU 620, an IOMMU 616, and a VM 644. As before, guest pages 630 of guest 628 are mapped to addresses in host memory 624. A vring DMA 626 is included that provides signals such as kick, TX, and RX.

Also in this embodiment, host kernel space 602 includes an IOMMU driver 606 that communicatively couples to IOMMU 616.

As before, vHost 610 provides mapping to guest pages 630, but in this case HPA mapping is provided via IOMMU 616. Furthermore, signals from vHost-net hardware 610 to guest 628 are provided via IOMMU 616.

VM 644 may be substantially similar or identical to VM 544. It includes a virtio-net driver 634, guest pages 630, guest visible device states 638, and a memory API 640. Because VM 644 can be the same for either a software-only vSwitch or a hardware assisted vSwitch with vHost off-loaded, it is possible to provide live migration between software-only vSwitches and hardware assisted vSwitches. For example, guest 628 may be started up with virtio-net driver 634, with vHost-net hardware 610 on the host side. Note that in some cases this may require memory pinning as described above, at least for the virtio-net memory portion. This version of vHost-net 610 is hardware offloaded. Thus, instead of starting up a new vHost-net thread to handle the queues, vHost-net may assign a VF to this guest and pass the memory location for where the vrings for the guest should be located. Guest 628 may copy data into its guest private memory and put a descriptor pointing to it into the descriptor table. The writing of this memory (if it is the first time this memory has been used) may trigger a page fault in the hypervisor. The hypervisor may then set up the guest memory and send an association between GPA and HVA to vHost-net hardware 610.

vHost-net hardware 610 now maps the GPA into the HPA using the mapping from QEMU. Normally, this information may be provided to the thread handling the RX or TX for that guest, but in this embodiment vHost-net hardware 610 instead is modified to program this into IOMMU 616. Guest 628 may then update the avail ring via an MMIO write, and the act of writing the avail index kicks the backend with the new data. The host hardware platform then receives the kick and reads the avail index. It can then read the host physical memory using the GPA provided in the descriptor queue. The IOMMU maps this GPA into an actual HPA location of memory, thus allowing the memory operation to correctly complete. The host hardware platform can pull all metadata and data out of memory and push it into the hardware vSwitch pipeline.

When the host hardware platform completes reading out the packet, it may optionally fire an interrupt indicating that it is done. vHost-net hardware 610 may be modified to watch the hardware interrupt and translate it into an IRQFD back to guest 628.

Figure 7:
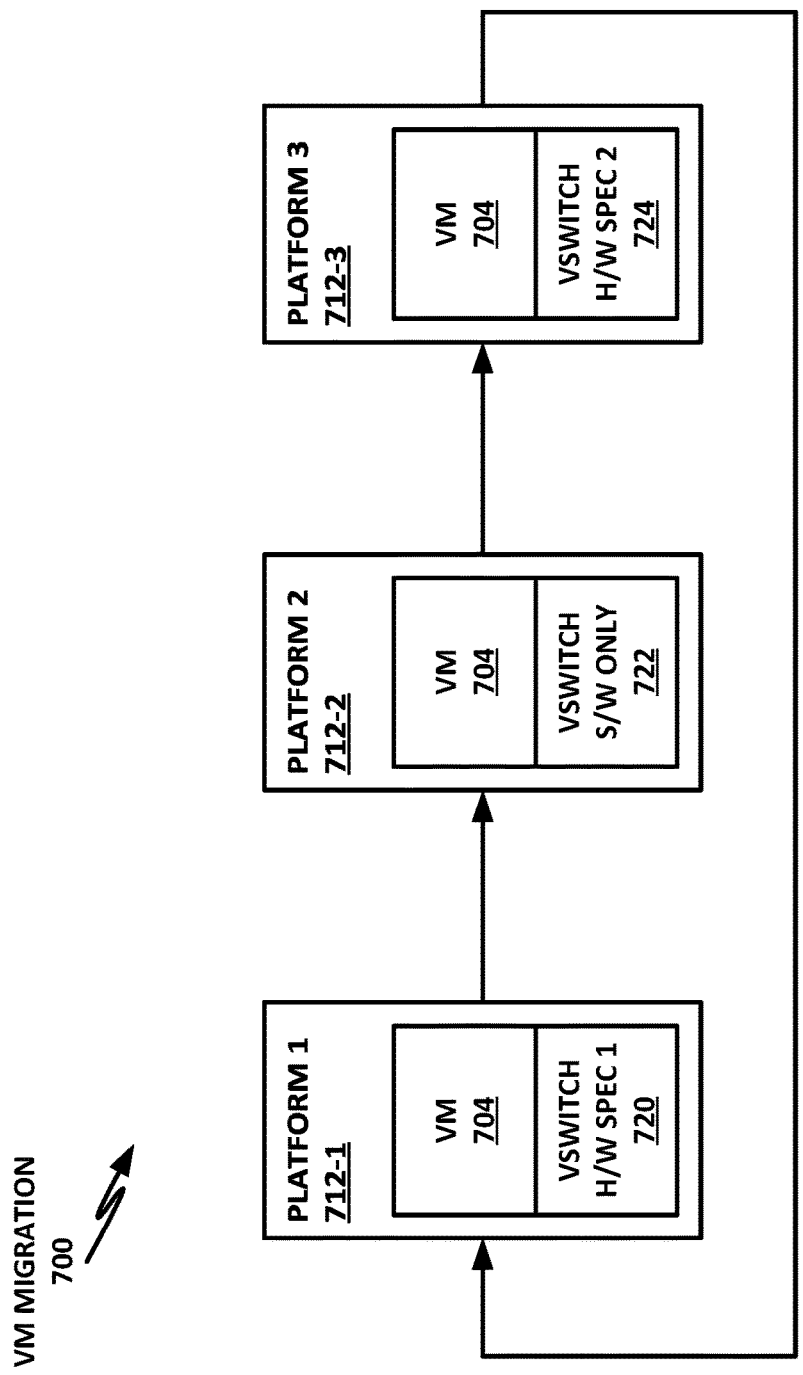
FIG. 7 is a block diagram of a virtual machine (VM) migration, according to one or more examples of the present specification.

FIG. 7 is a block diagram of VM migration 700, according to one or more examples of the present specification. This diagram illustrates that a single VM 704 can be migrated between different hardware platforms 712 as illustrated in the preceding two FIGURES.

For example, VM 704 may start on platform 1 712-1. Platform 1 712-1 includes a vSwitch with hardware species 1 720. vSwitch 720 may be, for example, a hardware assisted vSwitch with the hardware vSwitch functions provided by a switching chip from vendor A. This switch may not necessarily be compatible with a switching chip provided by vendor B.

However, because of the vHost offload hardware illustrated in the previous examples, VM 704 can be seamlessly migrated to platform 2 712-2. Platform 2 712-2 may be, for example, a known platform that provides a software-only vSwitch 722. Next, VM 704 may be seamlessly migrated to platform 3 712-3. Platform 3 712-3 may include a second hardware assisted vSwitch 724 with vSwitch hardware provided by vendor B, which may be incompatible with hardware provided by vendor A. However, because of the vHost-net hardware abstraction provided in the previous examples, this live migration is possible. Finally, VM 704 could be migrated back to platform 1 712-1 without the need for reconfiguration. This illustration is provided as a non-limiting example only, and it should be understood that other types of configurations are compatible with the teachings of this specification.

Figure 8:
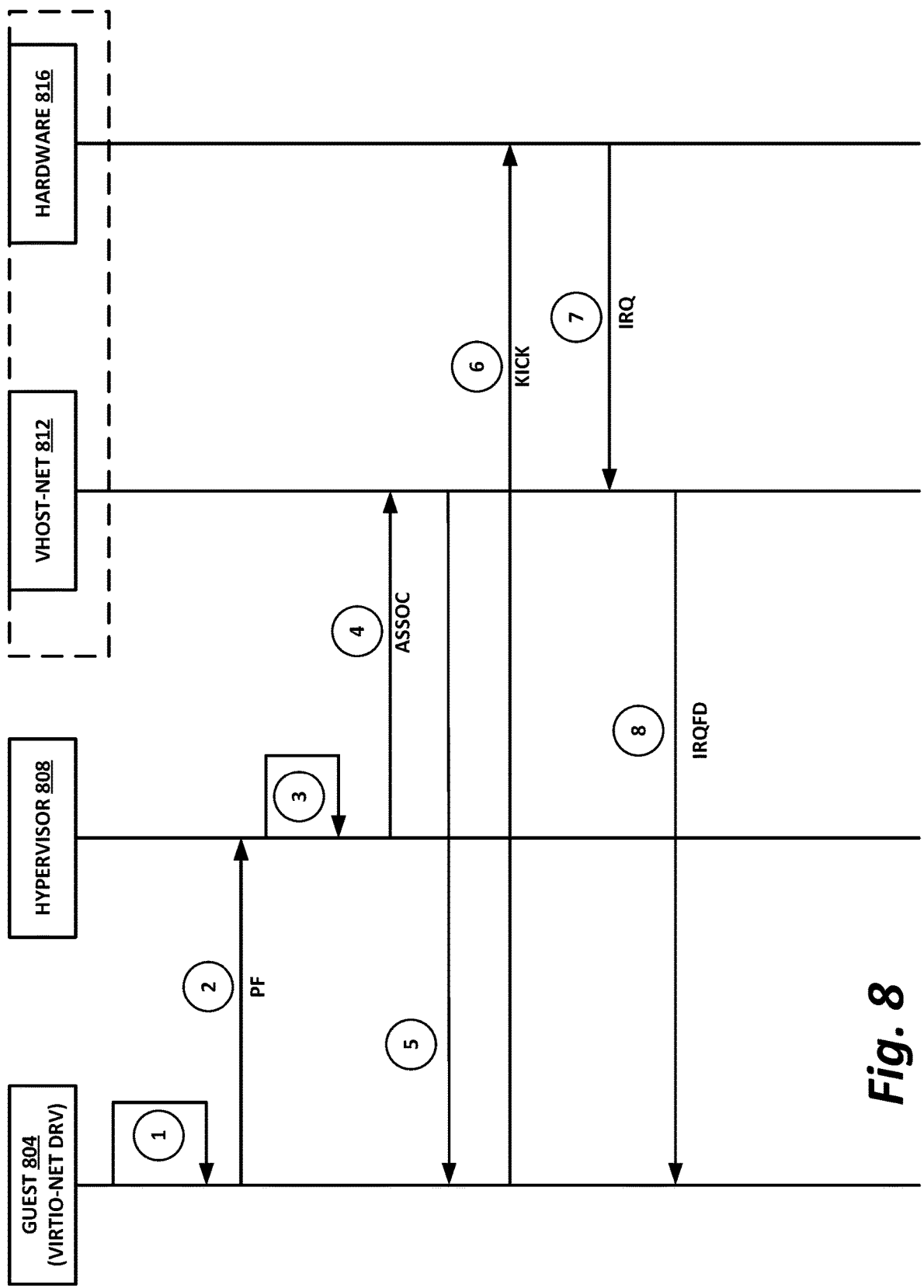
FIG. 8 is a signal flow diagram illustrating a guest transmit operation, according to one or more examples of the present specification.

FIG. 8 is a signal flow diagram illustrating a guest transmit operation, according to one or more examples of the present specification. In this case, guest 804 (which includes a virtio-net driver) operates under a hypervisor 808, which runs on a hardware platform including hardware 816, and vHost-net hardware 812.

In operation 1, guest 804 is started with a virtio-net driver that provides an abstraction layer for a vHost-net hardware 812 on the hardware platform. Note that vHost-net 812 is a hardware offloaded vHost. Also note that instead of starting up a new vHost-net thread to handle the queues, vHost-net 812 assigns a VF to guest 804 and passes the memory location where the vrings for the guest should be located. Guest 804 then copies data into its guest private memory, and puts a descriptor pointing to it into the descriptor table.

In one example, this writing of the memory (if it is the first time this memory has been used) triggers a page fault on hypervisor 808. In operation 3, responsive to the page fault, the hypervisor may set up the guest memory.

In operation four, hypervisor 808 sets up an association between GPA and HVA that is provided to vHost-net 812.

In operation 5, vHost-net 812 maps this GPA into HPA using the mapping from QEMU. In existing systems, this information could be given to the thread handling the RX or TX for that request. However, in this case, vHost-net is modified to program this into an IOMMU.

In operation 6, guest 804 updates the avail ring via an MMIO write, and the act of writing the avail index may kick the backend with new data.

The hardware device gets the kick and reads the avail index. It then goes to read the host physical memory using the GPA provided in the descriptor queue. The IOMMU may remap the GPA into an HPA location in memory, thus allowing the memory operation to complete correctly. The hardware platform can now pull all the metadata and data out of memory and push it into the hardware vSwitch pipeline.

In operation 7, when the hardware device is finished reading out the packet, it may optionally fire an interrupt to vHost-net 812, indicating that it is done. In operation 8, vHost-net 812 may watch the hardware interrupt, and translate it into an IRQFD back to guest 804.

Figure 9:
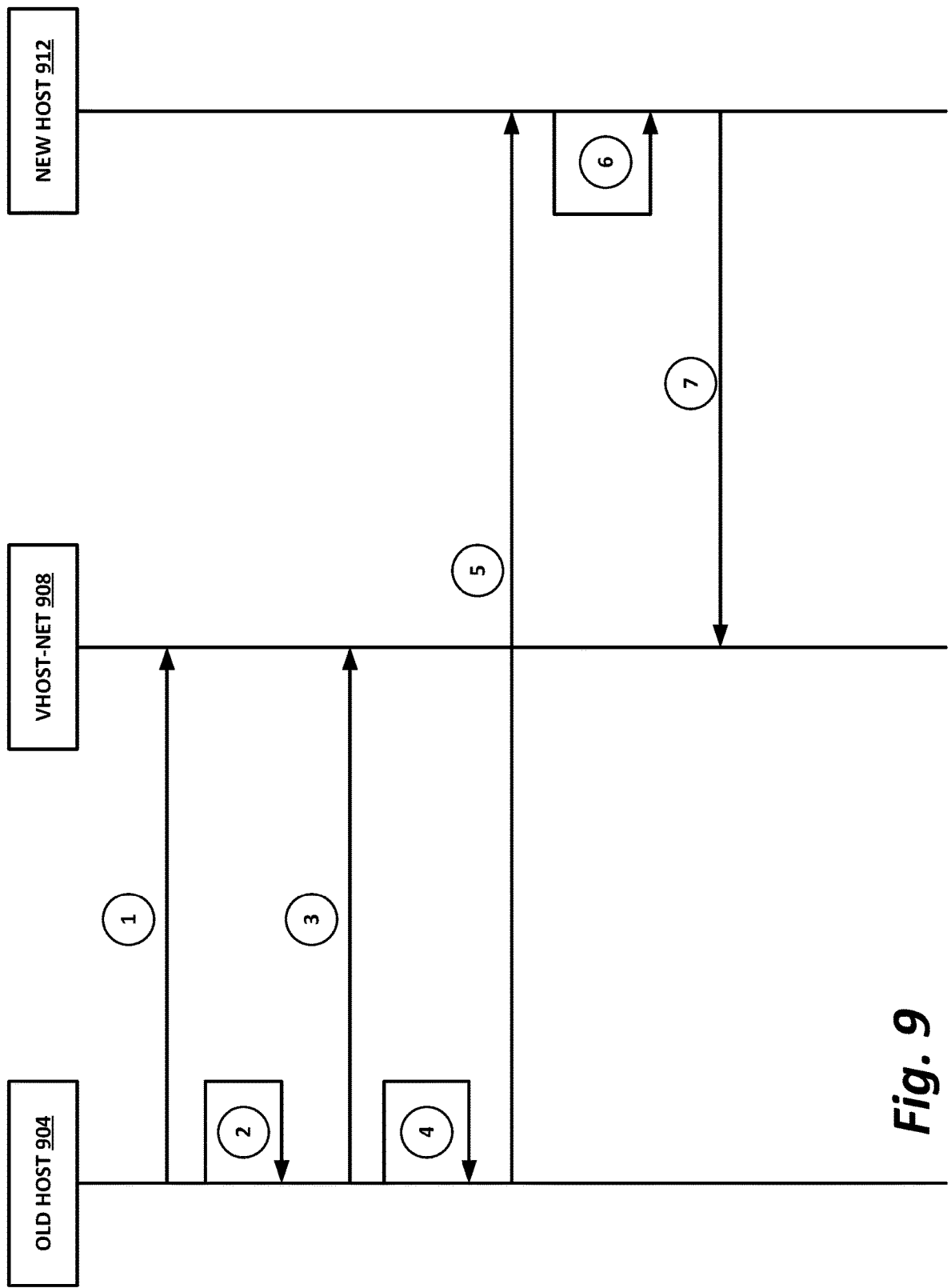
FIG. 9 is a signal flow diagram illustrating a live migration event, according to one or more examples of the present specification.

FIG. 9 is a signal flow diagram illustrating a live migration event, according to one or more examples of the present specification. During a live migration event, the set of active mappings in the IOMMU may be sent back to QEMU. This allows QEMU to dirty all active pages, to get the complete set of state and RAM for the migration event. The current active state of the RX or TX queue is logged to be sent alongside the VM, thus ensuring that the device state is reinstated at the destination. This works the same as in the previous examples, with the exception that kicks from the guest may be done through file descriptors. The flow for transmit works similarly, with the exception that the guest does not kick the hardware device directly, but instead this may be relayed via vHost-net or another vHost-net modification. Note that some examples may require the hardware to provide a secondary memory space for vHost-net to do the kick if the page in memory has to be used both for kicks and for the avail index from the guests.

During a live migration event, the software pulls the following out of hardware. First, it pulls IOMMU. The current set of pages being mapped into the IOMMU may be pulled out so that they can be dirtied. When these pages are accessed on the destination machine, a page fault will trigger allowing the destination system's state to be repopulated (either in hardware or in software, depending on its implementation). It may also pull the vring state out of hardware. In both hardware and software vring implementations, the device state should be carried with the VM to the destination. The hardware queues may provide exactly the same information about its state as a vHost-net thread in a software-only vSwitch. This includes the current state of the descriptor tables, indices, and interrupt state. At the destination, the vring state may be populated with this information and warm started with the current running state.

During a live migration event, additional state and/or configuration may be managed in the vSwitch. This may be a separate operation from what is handled in the host interface.

As shown in FIG. 9, at operation 1, during a live migration old host 904 initiates a live migration event on a particular VM. It sends a message to vHost-net 908 telling it to stop fetching new work.

vHost-net 908 then tells the underlying hardware to stop fetching new work.

In operation 2, on old host 904, the guest completes its work in progress. New transmit packets start to pile up in the guest memory, and incoming received packets are dropped.

In operation 3, old host 904 signals to vHost-net 908 that the stall is completed. Old host 904 then freezes the guest and copies the guest RAM.

In operation 4, the host reads configuration state and statistics populated in the device as well as the mappings programmed into the IOMMU.

In operation 5, this information is carried alongside the VM to new host 912.

In operation 6, new host 912 creates the new VM, then copies the RAM and the additional state information. The vHost on new host 912 is given the running state, to start it up in the same state as the source. New host 912 vHost-net sends the configuration state and statistics to the vrings (either in hardware or software) to warm start them in the same state as at the source.

In operation 7, the new host is unfrozen, and an event is sent to vHost-net to restart. The new vHost-net enables the vrings, either in software or in hardware.

Figure 10:
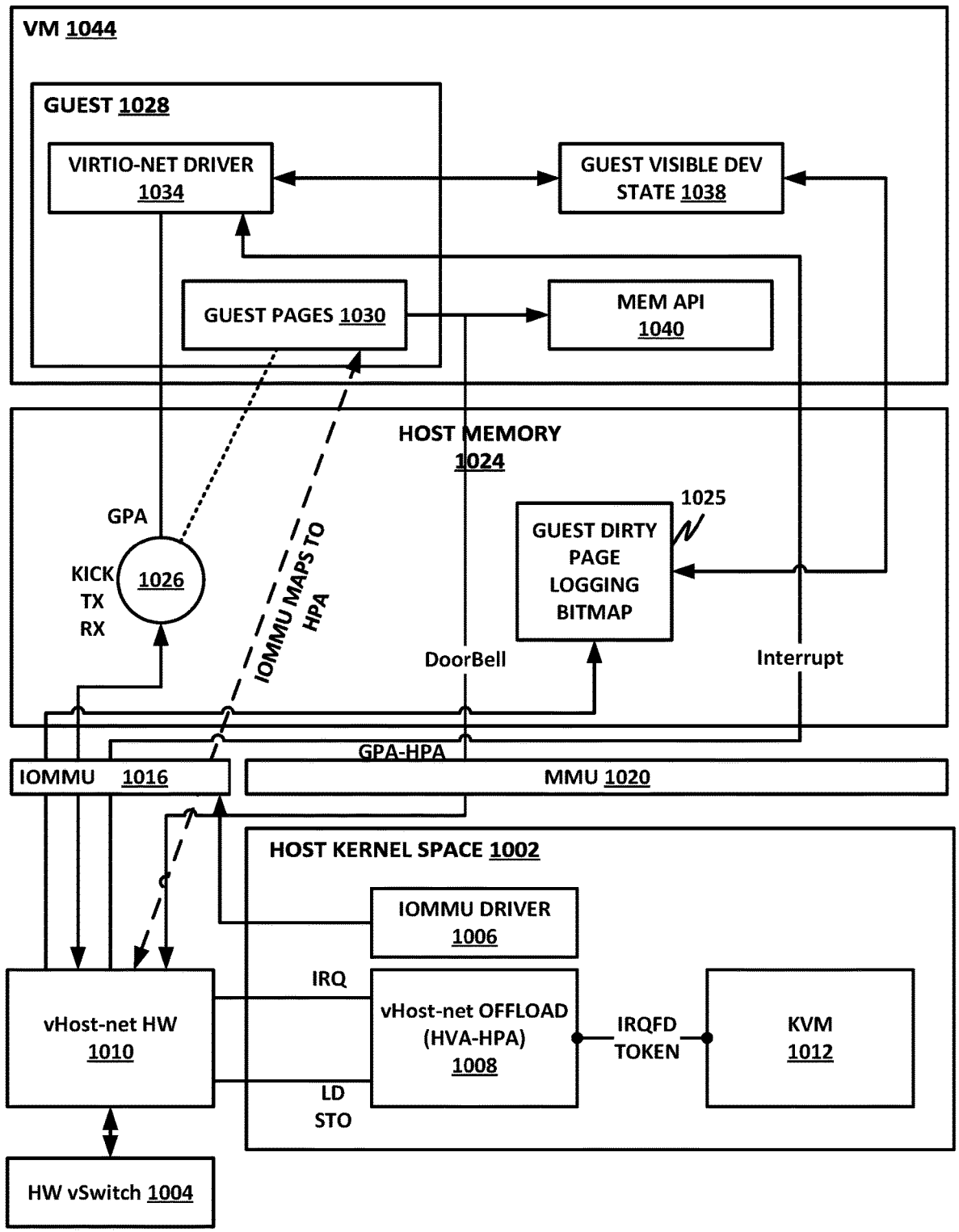
FIG. 10 illustrates a VNFI, according to one or more examples of the present specification.

FIG. 10 illustrates a VNFI, according to one or more examples of the present specification. FIG. 10 is similar to FIG. 6 in many respects, and further illustrates interrupt remapping via the IOMMU and doorbell mapping via the MMU EPT.

This VNFI includes a hardware (HW) vSwitch 1004 with exact-match cache (EMC) capability. HW vSwitch 1004 may be a hardware IP block, for example, a circuit similar or identical to the control hardware in a hardware switch or network interface device. In existing systems, VM 1044 would require a specific driver to operate with HW vSwitch 1004. But in this case, vHost-net hardware 1010 provides the "driver," abstracting out any functionality specific to HW vSwitch 1004, so that it can interact with guest 1020 via standardized virtio-net driver 1034. HW vSwitch 1004 determines how to handle incoming packets, and is also provided in hardware in this example.

Similar to FIG. 5, FIG. 6 includes a host kernel space 1002, a host memory 1024, an MMU 1020, an IOMMU 1016, and a VM 1044. As before, guest pages 1030 of guest 1028 are mapped to addresses in host memory 1024. A vring DMA 1026 is included that provides signals such as kick, TX, and RX.

Also in this embodiment, host kernel space 1002 includes an IOMMU driver 1006 that communicatively couples to IOMMU 1016.

As before, vHost 1010 provides mapping to guest pages 1030, but in this case HPA mapping is provided via IOMMU 1016. Furthermore, signals from vHost-net hardware 1010 to guest 1028 are provided via IOMMU 1016.

VM 1044 may be substantially similar or identical to VM 544. It includes a virtio-net driver 1034, guest pages 1030, guest visible device states 1038, and a memory API 1040. Because VM 1044 can be the same for either a software-only vSwitch or a hardware assisted vSwitch with vHost offloaded, it is possible to provide live migration between software-only vSwitches and hardware assisted vSwitches. For example, guest 1028 may be started up with virtio-net driver 1034, with vHost-net hardware 1010 on the host side. Note that in some cases this may require memory pinning as described above, at least for the virtio-net memory portion. This version of vHost-net 1010 is hardware offloaded. Thus, instead of starting up a new vHost-net thread to handle the queues, vHost-net may assign a VF to this guest and pass the memory location for where the vrings for the guest should be located. Guest 1028 may copy data into its guest private memory and put a descriptor pointing to it into the descriptor table. The writing of this memory (if it is the first time this memory has been used) may trigger a page fault in the hypervisor. The hypervisor may then set up the guest memory and send an association between GPA and HVA to vHost-net hardware 1010.

vHost-net hardware 1010 now maps the GPA into the HPA using the mapping from QEMU. Normally, this information may be provided to the thread handling the RX or TX for that guest, but in this embodiment vHost-net hardware 1010 instead is modified to program this into IOMMU 1016. Guest 1028 may then update the avail ring via an MMIO write, and the act of writing the avail index kicks the backend with the new data. The host hardware platform then receives the kick and reads the avail index. It can then read the host physical memory using the GPA provided in the descriptor queue. The IOMMU maps this GPA into an actual HPA location of memory, thus allowing the memory operation to correctly complete. The host hardware platform can pull all metadata and data out of memory and push it into the hardware vSwitch pipeline.

When the host hardware platform completes reading out the packet, it may optionally fire an interrupt indicating that it is done. vHost-net hardware 1010 may be modified to watch the hardware interrupt and translate it into an IRQFD back to guest 1028.

By way of instructions provided in software, an interrupt remapping table may be provided in IOMMU 1016, enabling vHost offload hardware 1010 to pass interrupts into a virtualized guest. By leveraging the interrupt remapping feature of IOMMU 1016 (e.g., posted interrupt), a hypervisor need not intervene in the relay Note that in the foregoing examples, in the guest, both the address translation (guest-to-host) and the interrupts are still relayed in the host. These may represent primary differences in performance between vHost offload and VF passthrough. It is possible to make updates purely on the host side (updates to QEMU, vHost-net, or others) to allow these to be offloaded completely, thus to close the performance gap. At that point, there would be no need to continue supporting virtio-net VF passthrough. Thus, embodiments of the present specification anticipate systems that do not support virtio-net VF passthrough.

Also note that guests that run a poll mode driver such as DPDK may not need these particular enhancements, because DPDK maps memory in HugePages to avoid the overhead of dynamic pages. DPDK also polls for data, thus avoiding the overhead of interrupts.

The foregoing outlines features of one or more embodiments of the subject matter disclosed herein. These embodiments are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present specification.

The PHOSITA will appreciate that they may readily use the present disclosure as a basis for designing or modifying other processes, structures, or variations for carrying out the same purposes and/or achieving the same advantages of the embodiments introduced herein. The PHOSITA will also recognize that such equivalent constructions do not depart from the spirit and scope of the present disclosure, and that they may make various changes, substitutions, and alterations herein without departing from the spirit and scope of the present disclosure.

In the foregoing description, certain aspects of some or all embodiments are described in greater detail than is strictly necessary for practicing the appended claims. These details are provided by way of non-limiting example only, for the purpose of providing context and illustration of the disclosed embodiments. Such details should not be understood to be required, and should not be "read into" the claims as limitations. The phrase may refer to "an embodiment" or "embodiments." These phrases, and any other references to embodiments, should be understood broadly to refer to any combination of one or more embodiments. Furthermore, the several features disclosed in a particular "embodiment" could just as well be spread across multiple embodiments. For example, if features 1 and 2 are disclosed in "an embodiment," embodiment A may have feature 1 but lack feature 2, while embodiment B may have feature 2 but lack feature 1.

This specification may provide illustrations in a block diagram format, wherein certain features are disclosed in separate blocks. These should be understood broadly to disclose how various features interoperate, but are not intended to imply that those features must necessarily be embodied in separate hardware or software. Furthermore, where a single block discloses more than one feature in the same block, those features need not necessarily be embodied in the same hardware and/or software. For example, a computer "memory" could in some circumstances be distributed or mapped between multiple levels of cache or local memory, main memory, battery-backed volatile memory, and various forms of persistent memory such as a hard disk, storage server, optical disk, tape drive, or similar. In certain embodiments, some of the components may be omitted or consolidated. In a general sense, the arrangements depicted in the FIGURES may be more logical in their representations, whereas a physical architecture may include various permutations, combinations, and/or hybrids of these elements. Countless possible design configurations can be used to achieve the operational objectives outlined herein. Accordingly, the associated infrastructure has a myriad of substitute arrangements, design choices, device possibilities, hardware configurations, software implementations, and equipment options.

References may be made herein to a computer-readable medium, which may be a tangible and non-transitory computer-readable medium. As used in this specification and throughout the claims, a "computer-readable medium" should be understood to include one or more computer-readable mediums of the same or different types. A computer-readable medium may include, by way of non-limiting example, an optical drive (e.g., CD/DVD/Blu-Ray), a hard drive, a solid-state drive, a flash memory, or other non-volatile medium. A computer-readable medium could also include a medium such as a read-only memory (ROM), an FPGA or ASIC configured to carry out the desired instructions, stored instructions for programming an FPGA or ASIC to carry out the desired instructions, an intellectual property (IP) block that can be integrated in hardware into other circuits, or instructions encoded directly into hardware or microcode on a processor such as a microprocessor, digital signal processor (DSP), microcontroller, or in any other suitable component, device, element, or object where appropriate and based on particular needs. A nontransitory storage medium herein is expressly intended to include any nontransitory special-purpose or programmable hardware configured to provide the disclosed operations, or to cause a processor to perform the disclosed operations.

Various elements may be "communicatively," "electrically," "mechanically," or otherwise "coupled" to one another throughout this specification and the claims. Such coupling may be a direct, point-to-point coupling, or may include intermediary devices. For example, two devices may be communicatively coupled to one another via a controller that facilitates the communication. Devices may be electrically coupled to one another via intermediary devices such as signal boosters, voltage dividers, or buffers. Mechanically-coupled devices may be indirectly mechanically coupled.

Any "module" or "engine" disclosed herein may refer to or include software, a software stack, a combination of hardware, firmware, and/or software, a circuit configured to carry out the function of the engine or module, a co-processor, FPGA, ASIC, or any computer-readable medium as disclosed above. Such modules or engines may, in appropriate circumstances, be provided on or in conjunction with a hardware platform, which may include hardware compute resources such as a processor, memory, storage, interconnects, networks and network interfaces, accelerators, or other suitable hardware. Such a hardware platform may be provided as a single monolithic device (e.g., in a PC form factor), or with some or part of the function being distributed (e.g., a "composite node" in a high-end data center, where compute, memory, storage, and other resources may be dynamically allocated and need not be local to one another).

There may be disclosed herein flow charts, signal flow diagram, or other illustrations showing operations being performed in a particular order. Unless otherwise expressly noted, or unless required in a particular context, the order should be understood to be a non-limiting example only. Furthermore, in cases where one operation is shown to follow another, other intervening operations may also occur, which may be related or unrelated. Some operations may also be performed simultaneously or in parallel. In cases where an operation is said to be "based on" or "according to" another item or operation, this should be understood to imply that the operation is based at least partly on or according at least partly to the other item or operation. This should not be construed to imply that the operation is based solely or exclusively on, or solely or exclusively according to the item or operation.

All or part of any hardware element disclosed herein may readily be provided in a system-on-a-chip (SoC), including a central processing unit (CPU) package. An SoC represents an integrated circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package.

In a general sense, any suitably-configured circuit or processor can execute any type of instructions associated with the data to achieve the operations detailed herein. Any processor disclosed herein could transform an element or an article (for example, data) from one state or thing to another state or thing. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms "memory" and "storage," as appropriate.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. Any suitable processor and memory can be suitably coupled to the board based on particular configuration needs, processing demands, and computing designs. Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

EXAMPLE IMPLEMENTATIONS

The following examples are provided by way of illustration.

Example 1 includes a computing apparatus for providing a hardware-assisted virtual switch on a host, comprising: a hardware virtual switch (vSwitch) circuit; and a hardware virtual host (vHost) circuit, the vHost circuit having an interface driver specific to the hardware vSwitch and configured to provide a vHost data plane to: provide a plurality of hardware queues to communicatively couple the hardware vSwitch to a guest virtual function (VF); and present to a virtual network driver of the guest VF an interface that is backward compatible with a software network interface.

Example 2 includes the computing apparatus of example 1, wherein the virtual network driver is to provide vHost control plane functionality.

Example 3 includes the computing apparatus of example 1, wherein the vHost control plane functionality comprises capability negotiation.

Example 4 includes the computing apparatus of example 1, wherein the vHost control plane functionality comprises live migration.

Example 5 includes the computing apparatus of example 1, wherein the vHost circuit is to receive an eventfd kick and translate the kick into a hardware write on the host.

Example 6 includes the computing apparatus of example 1, wherein the vHost circuit is to provide an interrupt request (IRQ) relay to receive a host-side hardware IRQ, and translate the host-side IRQ into a software IRQ on the guest.

Example 7 includes the computing apparatus of example 1, wherein the vHost circuit is to provide a host-side interrupt request (IRQ) directly to the VM, comprising translating the host-side IRQ into a guest-specific interrupt via an input/output memory management unit (IOMMU).

Example 8 includes the computing apparatus of example 1 further comprising an input/output memory management unit (IOMMU), wherein the vHost circuit is to map a guest physical address (GPA) space into a host physical address (HPA) space in the IOMMU, wherein host hardware is to locate HPAs via GPAs.

Example 9 includes the computing apparatus of example 8, wherein the vHost circuit is provide hardware separation of input/output operations for a plurality of guest virtual machines.

Example 10 includes the computing apparatus of example 8, wherein the vHost circuit is to receive a kick, read an "avail" index, and read from a host physical memory address according to a GPA in a descriptor queue of the avail index.

Example 11 includes the computing apparatus of example 8, wherein the vHost circuit is to pin GPA pages into host memory.

Example 12 includes the computing apparatus of example 11, wherein pinning GPA pages into host memory comprises pinning only memory for the virtual network driver.

Example 13 includes the computing apparatus of example 1, wherein the vHost circuit is to receive a live migration event notification, and responsive to the live migration event notification, dirty active memory pages of the guest VF and swap active memory pages out of cache.

Example 14 includes the computing apparatus of example 1, wherein the vHost circuit is to perform pure host-side updates of guest-to-host address translation and interrupts, wherein VF passthrough for the virtual network driver is not provided to the guest.

Example 15 includes the computing apparatus of any of examples 1-14, wherein the hardware vSwitch comprises a hardware IP block.

Example 16 includes one or more tangible, non-transitory computer-operable mediums having encoded thereon instructions to provide a hardware virtual host (vHost) to: communicatively couple to a hardware virtual switch (vSwitch) circuit; provide an interface driver specific to the hardware vSwitch and configured to provide a vHost data plane to: provide a plurality of hardware queues to communicatively couple the hardware vSwitch to a guest virtual function (VF); and present to a virtual network driver of the guest VF an interface that is backward compatible with a software network interface.

Example 17 includes the one or more tangible, non-transitory computer-operable mediums of example 16, wherein the virtual network driver is to provide vHost control plane functionality.

Example 18 includes the one or more tangible, non-transitory computer-operable mediums of example 16, wherein the vHost control plane functionality comprises capability negotiation.

Example 19 includes the one or more tangible, non-transitory computer-operable mediums of example 16, wherein the vHost control plane functionality comprises live migration.

Example 20 includes the one or more tangible, non-transitory computer-operable mediums of example 16, wherein the hardware vHost is to receive an eventfd kick and translate the kick into a hardware write on the host.

Example 21 includes the one or more tangible, non-transitory computer-operable mediums of example 16, wherein the hardware vHost is to provide an interrupt request (IRQ) relay to receive a host-side hardware IRQ, and translate the host-side IRQ into a software IRQ on the guest.

Example 22 includes the one or more tangible, non-transitory computer-operable mediums of example 16, wherein the hardware vHost is to communicatively couple to an input/output memory management unit (IOMMU), wherein the hardware vHost is to map a guest physical address (GPA) space into a host physical address (HPA) space in the IOMMU, wherein host hardware is enabled to locate HPAs via GPAs.

Example 23 includes the one or more tangible, non-transitory computer-operable mediums of example 16, wherein the hardware vHost is to receive a kick, read an "avail" index, and read from a host physical memory address according to a GPA in a descriptor queue of the avail index.

Example 24 includes the one or more tangible, non-transitory computer-operable mediums of example 23, wherein the hardware vHost is to pin GPA pages into host memory.

Example 25 includes the one or more tangible, non-transitory computer-operable mediums of example 23, wherein pinning GPA pages into host memory comprises pinning only memory for the virtual network driver.

Example 26 includes the one or more tangible, non-transitory computer-operable mediums of example 16, wherein the hardware vHost is to receive a live migration event notification, and responsive to the live migration event notification, dirty active memory pages of the guest VF and swap active memory pages out of cache.

Example 27 includes the one or more tangible, non-transitory computer-operable mediums of example 16, wherein the hardware vHost is to perform pure host-side updates of guest-to-host address translation and interrupts, wherein VF passthrough for the virtual network driver is not provided to the guest.

Example 28 includes the one or more tangible, non-transitory computer-operable mediums of any of examples 16-27, wherein the instructions comprise an application-specific integrated circuit.

Example 29 includes the one or more tangible, non-transitory computer-operable mediums of any of examples 16-27, wherein the instructions comprise instructions or information to manufacture an integrated circuit.

Example 30 includes the one or more tangible, non-transitory computer-operable mediums of any of examples 16-27, wherein the instructions comprise a field-programmable gate array.

Example 31 includes the one or more tangible, non-transitory computer-operable mediums of any of examples 16-27, wherein the instructions comprise instructions to program a field-programmable gate array.

Example 32 includes the one or more tangible, non-transitory computer-operable mediums of any of examples 16-27, wherein the instructions comprise an intellectual property block.

Example 33 includes a computer-implemented method of providing hardware-assisted virtual host (vHost) services to a hardware virtual switch (vSwitch), comprising: communicatively coupling to the hardware vSwitch; providing an interface driver specific to the hardware vSwitch and configured to provide a vHost data plane: providing a plurality of hardware queues to communicatively couple the hardware vSwitch to a guest virtual function (VF); and presenting to a virtual network driver of the guest VF an interface that is backward compatible with a software network interface.

Example 34 includes the method of example 33, wherein the virtual network driver is to provide vHost control plane functionality.

Example 35 includes the method of example 33, wherein the vHost control plane functionality comprises capability negotiation.

Example 36 includes the method of example 33, wherein the vHost control plane functionality comprises live migration.

Example 37 includes the method of example 33, further comprising receiving an eventfd kick and translating the kick into a hardware write on the host.

Example 38 includes the method of example 33, further comprising providing an interrupt request (IRQ) relay to receive a host-side hardware IRQ, and translating the host-side IRQ into a software IRQ on the guest.

Example 39 includes the method of example 33, further comprising communicatively coupling to an input/output memory management unit (IOMMU) and mapping a guest physical address (GPA) space into a host physical address (HPA) space in the IOMMU, wherein a host hardware is enabled to locate HPAs via GPAs.

Example 40 includes the method of example 33, further comprising receiving a kick, reading an "avail" index, and reading from a host physical memory address according to a GPA in a descriptor queue of the avail index.

Example 41 includes the method of example 40, further comprising pinning GPA pages into host memory.

Example 42 includes the method of example 41, wherein pinning GPA pages into host memory comprises pinning only memory for the virtual network driver.

Example 43 includes the method of example 33, further comprising receiving a live migration event notification, and responsive to the live migration event notification, dirty active memory pages of the guest VF and swap active memory pages out of cache.

Example 44 includes the method of example 33, further comprising performing pure host-side updates of guest-to-host address translation and interrupts, wherein VF passthrough for the virtual network driver is not provided to the guest.

Example 45 includes an apparatus comprising means for performing the method of any of examples 33-44.

Example 46 includes one or more tangible, non-transitory computer-operable mediums having encoded thereon instructions for providing the method of any of examples 33-44.

Example 47 includes the one or more tangible, non-transitory computer-operable mediums of example 46, wherein the instructions comprise an application-specific integrated circuit.

Example 48 includes the one or more tangible, non-transitory computer-operable mediums of example 46, wherein the instructions comprise instructions or information to manufacture an integrated circuit.

Example 49 includes the one or more tangible, non-transitory computer-operable mediums of example 46, wherein the instructions comprise a field-programmable gate array.

Example 50 includes the one or more tangible, non-transitory computer-operable mediums of example 46, wherein the instructions comprise instructions to program a field-programmable gate array.

Example 51 includes the one or more tangible, non-transitory computer-operable mediums of example 46, wherein the instructions comprise an intellectual property block.

What is claimed is:

1. A computing apparatus for providing a hardware-assisted virtual switch on a host, comprising: a hardware virtual switch (vSwitch) circuit; and a hardware virtual host (vHost) circuit, the hardware vHost circuit to include an interface driver to the hardware vSwitch circuit, the hardware vHost circuit to be configured to provide a vHost data plane to: provide a plurality of hardware queues to communicatively couple the hardware vSwitch circuit to a guest virtual function (VF); and present, to a virtual network driver of the guest VF, the interface driver in an abstraction that is compatible with both a software vSwitch and the hardware vSwitch circuit;

wherein: the virtual network driver comprises a paravirtualized driver and belongs to one of a plurality of possible driver versions; and availability of at least one capability of the hardware vSwitch to the guest VF is dependent upon which one of the possible driver versions to which the virtual network driver belongs.

2. The computing apparatus of claim 1, wherein the virtual network driver is to provide a vHost control plane functionality.

3. The computing apparatus of claim 2, wherein the vHost control plane functionality comprises capability negotiation.

4. The computing apparatus of claim 2, wherein the vHost control plane functionality comprises live migration.

5. The computing apparatus of claim 2, wherein the hardware vHost circuit is to receive an eventfd kick and translate the eventfd kick into a hardware write on the host.

6. The computing apparatus of claim 1, wherein the hardware vHost circuit is to provide an interrupt request (IRQ) relay to receive a host-side hardware IRQ, and translate the host-side IRQ into a software IRQ on the guest.

7. The computing apparatus of claim 1, wherein the hardware vHost circuit is to provide a host-side interrupt request (IRQ) directly to the guest VF, comprising translating the host-side IRQ into a guest-specific interrupt via an input/output memory management unit (IOMMU).

8. The computing apparatus of claim 1 further comprising an input/output memory management unit (IOMMU), wherein the hardware vHost circuit is to map a guest physical address (GPA) space into a host physical address (HPA) space in the IOMMU, wherein host hardware is to locate HPAs via GPAs.

9. The computing apparatus of claim 8, wherein the hardware vHost circuit is configured to provide hardware separation of input/output operations for a plurality of virtual machines.

10. The computing apparatus of claim 8, wherein the hardware vHost circuit is to receive a kick, read an "avail" index, and read from a host physical memory address according to a GPA in a descriptor queue of the avail index.

11. The computing apparatus of claim 8, wherein the hardware vHost circuit is to pin GPA pages into host memory.

12. The computing apparatus of claim 11, wherein pinning GPA pages into host memory comprises pinning only memory for the virtual network driver.

13. The computing apparatus of claim 1, wherein the hardware vHost circuit is to receive a live migration event notification, and responsive to the live migration event notification, dirty active memory pages of the guest VF and swap active memory pages out of cache.

14. The computing apparatus of claim 1, wherein the hardware vHost circuit is to perform pure host-side updates of guest-to-host address translation and interrupts, wherein a VF passthrough for the virtual network driver is not provided to the guest VF.

15. The computing apparatus of claim 1, wherein the hardware vSwitch circuit comprises a hardware IP block.

16. One or more tangible, non-transitory computer-operable mediums having encoded thereon instructions to provide a hardware virtual host (vHost) to: communicatively couple to a hardware virtual switch (vSwitch) circuit; provide an interface driver to the hardware vSwitch circuit and configured to provide a vHost data plane to: provide a plurality of hardware queues to communicatively couple the hardware vSwitch circuit to a guest virtual function (VF); and present, to a virtual network driver of the guest VF, the interface driver in an abstraction that is compatible with both a software vSwitch and the hardware vSwitch circuit;
    wherein: the virtual network driver comprises a paravirtualized driver and belongs to one of a plurality of possible driver versions; and availability of at least one capability of the hardware vSwitch to the guest VF is dependent upon which one of the possible driver versions to which the virtual network driver belongs.

17. The one or more tangible, non-transitory computer-operable mediums of claim 16, wherein the hardware vHost is to receive an eventfd kick and translate the eventfd kick into a hardware write on a host.

18. The one or more tangible, non-transitory computer-operable mediums of claim 16, wherein the hardware vHost is to communicatively couple to an input/output memory management unit (IOMMU), wherein the hardware vHost is to map a guest physical address (GPA) space into a host physical address (HPA) space in the IOMMU, wherein host hardware is enabled to locate HPAs via GPAs.

19. A computer-implemented method of providing hardware-assisted virtual host (vHost) services to a hardware virtual switch (vSwitch), comprising: communicatively coupling to the hardware vSwitch; providing an interface driver to the hardware vSwitch and configured to provide a vHost data plane: providing a plurality of hardware queues to communicatively couple the hardware vSwitch to a guest virtual function (VF); and presenting, to a virtual network driver of the guest VF, the interface driver in an abstraction that is compatible with both a software vSwitch and the hardware vSwitchj
    wherein: the virtual network driver comprises a paravirtualized driver and belongs to one of a plurality of possible driver versions; and availability of at least one capability of the hardware vSwitch to the guest VF is dependent upon which one of the possible driver versions to which the virtual network driver belongs.

20. The method of claim 19, wherein the virtual network driver is to provide a vHost control plane functionality.

* * * * *